(12) United States Patent
Russell et al.

(10) Patent No.: US 9,613,573 B2
(45) Date of Patent: Apr. 4, 2017

(54) LIGHT MODULATING BACKPLANE WITH CONFIGURABLE MULTI-ELECTRODE PIXELS

(71) Applicants: Andrew Ian Russell, San Jose, CA (US); Craig Michael Waller, Dallas, TX (US); Eric Paul Eisenbrandt, Allen, TX (US)

(72) Inventors: Andrew Ian Russell, San Jose, CA (US); Craig Michael Waller, Dallas, TX (US); Eric Paul Eisenbrandt, Allen, TX (US)

(73) Assignee: Syndiant, Inc., Dallas, TX (US)

( * ) Notice: Subject to any disclaimer, the term of this patent is extended or adjusted under 35 U.S.C. 154(b) by 303 days.

(21) Appl. No.: 14/273,550

(22) Filed: May 9, 2014

(65) Prior Publication Data

US 2015/0323851 A1    Nov. 12, 2015

(51) Int. Cl.
| | | |
|---|---|---|
| *G09G 3/36* | (2006.01) | |
| *G02F 1/29* | (2006.01) | |
| *G02F 1/1362* | (2006.01) | |
| *G02F 1/1343* | (2006.01) | |

(52) U.S. Cl.
CPC .............. *G09G 3/36* (2013.01); *G02F 1/1362* (2013.01); *G02F 1/136277* (2013.01); *G02F 1/29* (2013.01); *G02F 1/1343* (2013.01)

(58) Field of Classification Search
CPC ..... G09G 3/36; G02F 1/1362; G02F 1/136277; G02F 1/129; G02F 1/1343
See application file for complete search history.

(56) References Cited

U.S. PATENT DOCUMENTS

2012/0320321 A1*  12/2012  Ong .................. G02F 1/133707
349/108

\* cited by examiner

*Primary Examiner* — Joseph P Martinez
(74) *Attorney, Agent, or Firm* — Silicon Valley Patent Group, LLC; Edward S. Mao

(57) ABSTRACT

A light modulating Backplane with configurable multi-electrode pixels is disclosed. The configurable multi-electrode pixel includes a first set of dot electrodes in a first field and a second set of dot electrodes in a second field. Generally, dot electrode is included in both the first set of dot electrodes and the second set of dot electrodes. For example, a pixel control circuit coupled to a dedicated dot electrode. A first dot electrode is coupled to the pixel control circuit by a first dot electrode connection circuit and a second dot electrode is coupled to the pixel control circuit by a second dot electrode connection circuit. During the first field the first dot electrode connection circuit is active while the second dot electrode connection circuit is inactive. During the second field, the first dot electrode connection circuit is inactive while the second dot electrode connection circuit is active.

21 Claims, 21 Drawing Sheets

LIGHT MODULATING BACKPLANE WITH CONFIGURABLE MULTI-ELECTRODE PIXELS

BACKGROUND OF THE INVENTION

Field of the Invention

The present invention relates to display technology. More specifically, the present invention relates to digital backplanes that control light modulating elements, spatial light modulators and light sources.

Discussion of Related Art

Micro-displays typically include light modulating backplane and a light modulating unit or a light emitting unit. Light modulating units include such technologies as liquid crystal on silicon (LCOS) and digital micro mirrors devices (DMD). Light emitting units include technologies such as Organic light emitting diodes (OLED). The technology used in such micro displays can also be used to make larger display units.

FIGS. 1A and 1B illustrate a small portion of a conventional LCOS display 100. Specifically, FIG. 1B only shows 24 pixels of LCOS display 100. Generally, a LCOS display would have thousands of pixels. FIG. 1A is a cross sectional view of display 100 along the A A' cut shown in FIG. 1B. However FIG. 1B shows only one layer of LCOS display 100.

In FIG. 1A, a substrate 110 supports pixel control circuits PCC_1_1, PCC_2_1, PCC_3_1, PCC_4_1, PCC_5_1, and PCC_6_1. Above the pixel control circuits are pixel electrodes PE_1_1, PE_2_1, PE_3_1, PE_4_1, PE_5_1, and PE_6_1. Each pixel electrode PE_X_Y is coupled to and controlled by pixel control circuit PCC_X_Y. Thus, pixel electrode PE_1_1 is coupled to and controlled by pixel control circuit PCC_1_1. Similarly, electrodes PE_2_1, PE_3_1, PE_4_1, PE_5_1, and PE_6_1 are coupled to and controlled by pixel control circuits PCC_2_1, PCC_3_1, PCC_4_1, PCC_5_1, and PCC_6_1, respectively. For LCOS display 100, the pixel electrodes are made of a reflective conductor to reflect incoming light as explained below. As shown in FIG. 1B, the polarized electrodes are arranged in a rectangular matrix. For clarity the pixel electrodes are PE_X_Y, where X refers to the column location of the pixel electrode and Y refers to the row location of the pixel electrode.

Substrate 110 would also include various, logic circuits to support the operation of the pixel control circuits. For clarity these logic circuits are omitted in the Figures because the omitted logic circuits, which are well known in the art, are not an integral aspect of the present invention. Substrate 110, the pixel control circuits, the pixel electrodes and the omitted logic circuits form the light modulating backplane. An example of a light modulating backplane is described in U.S. Pat. No. 7,071,908, entitled "Digital Backplane" by Guttag et al., which is included herein by reference. Another example of a light modulating backplane is described in U.S. Pat. No. 8,605,015 entitled "Spatial Light Modulator with Masking Comparators" by Guttag et al., which is incorporated herein by reference.

The light modulating unit of LCOS display 100 includes a liquid crystal layer 120, an alignment layer 130, a transparent common electrode layer 140, and a protective glass layer 150. Protective glass layer 150 protects the rest of LCOS display 100 but typically does not manipulate incoming or reflected light. Transparent common electrode layer 140 works with the pixel electrodes to manipulate the liquid crystals in liquid crystal layer 120. Alignment layer 130 aligns the liquid crystals in liquid crystal layer 120 to properly manipulate incoming and reflected light. Liquid crystal layer 120 contains liquid crystals that are controlled by the pixel electrodes to selectively pass incoming polarized light through liquid crystal layer 120. Specifically, when a pixel electrode is charged to an "active state" by the corresponding pixel control circuit polarized light can pass through the area of liquid crystal layer 120 above the pixel electrode and be reflected back by the pixel electrode. However, if the pixel electrode is in an inactive state polarized light is blocked in the area of liquid crystal layer 120 above the pixel electrode. Pulse width modulation is used to create different contrast levels. For color displays, color filters can be included in the light modulating unit or field sequential color schemes (i.e. rapidly cycling through three different colored light sources).

The transition from standard definition video to high definition video and beyond has created a great demand for higher resolution displays. However, for light modulating backplanes the size of the pixel control circuits is becoming a limiting factor for the density of pixels in a light modulating backplane. Thus, to create higher resolution light modulating backplanes using conventional techniques, the overall size of the light modulating backplane must be increased. However, increasing the size of the light modulating backplane would also increase the cost and power consumption. Hence there is a need for a method or system create high resolution light modulating backplanes.

SUMMARY

Accordingly, the present invention provides a novel high resolution light modulating backplane by using configurable multi-electrode pixels. A configurable multi-electrode pixel uses a first set of dot electrodes during a first field and a second set of dot electrodes during a second field. In some embodiments of the present invention one or more dedicated dot electrodes would be included in both the first set of dot electrodes and the second set of dot electrodes. In one embodiment of the present a configurable multi-electrode pixel includes a pixel control circuit, a dedicated dot electrode, a first dot electrode, a first dot electrode connection circuit, a second dot electrode, and a second dot electrode connection circuit. The first dot electrode connection circuit is coupled to the first dot electrode and the pixel control circuit. Similarly, the second dot electrode connection circuit is coupled to the second dot electrode and the pixel control circuit. The dedicated dot electrode is coupled directly to the pixel control circuit. During a first field, the first dot electrode connection circuit is in an active state and the second dot connection circuit is in an inactive state. During a second field, the first dot electrode connection circuit is in the inactive state and the second dot connection circuit is in an active state. Thus, during the first field, the configurable multi-electrode pixel uses the first dot electrode and the dedicated dot electrode. Conversely, during the second field the configurable multi-electrode pixel uses the second dot electrode and the dedicated dot electrode.

In another embodiment of the present invention, the configurable multi-electrode pixel also includes a third dot electrode, a fourth dot electrode, a fifth dot electrode and a sixth dot electrode. A third dot electrode connection circuit couples the third dot electrode to the pixel control circuit. A fourth dot electrode connection circuit couples the fourth dot electrode to the pixel control circuit. A fifth dot electrode connection circuit couples the fifth dot electrode to the pixel control circuit and a sixth dot electrode connection circuit couples the sixth dot electrode to the pixel control circuit. The first dot electrode, the third dot electrode, the fifth dot electrode, and the dedicated dot electrode form a rectangle. Similarly, the second dot electrode, the fourth dot electrode, the sixth dot electrode, and the dedicated dot electrode also form a rectangle. During the first field, the configurable multi-electrode pixel uses the first dot electrode, the third dot electrode, the fifth dot electrode and the dedicated dot electrode. During the second field the configurable multi-electrode pixel uses the second dot electrode, the fourth dot electrode, the sixth dot electrode and the dedicated dot electrode.

The present invention will be more fully understood in view of the following description and drawings.

DETAILED DESCRIPTION

As explained above, the resolution of conventional light modulating backplanes are limited by the size of the pixel control circuits. However light modulating backplanes in accordance with embodiments of the present have an effective resolution greater than the number pixel control circuits. Configurable multi-electrode pixels are used with interlacing schemes so that a single pixel control circuit controls different pixels in different frames.

Figure 1A:
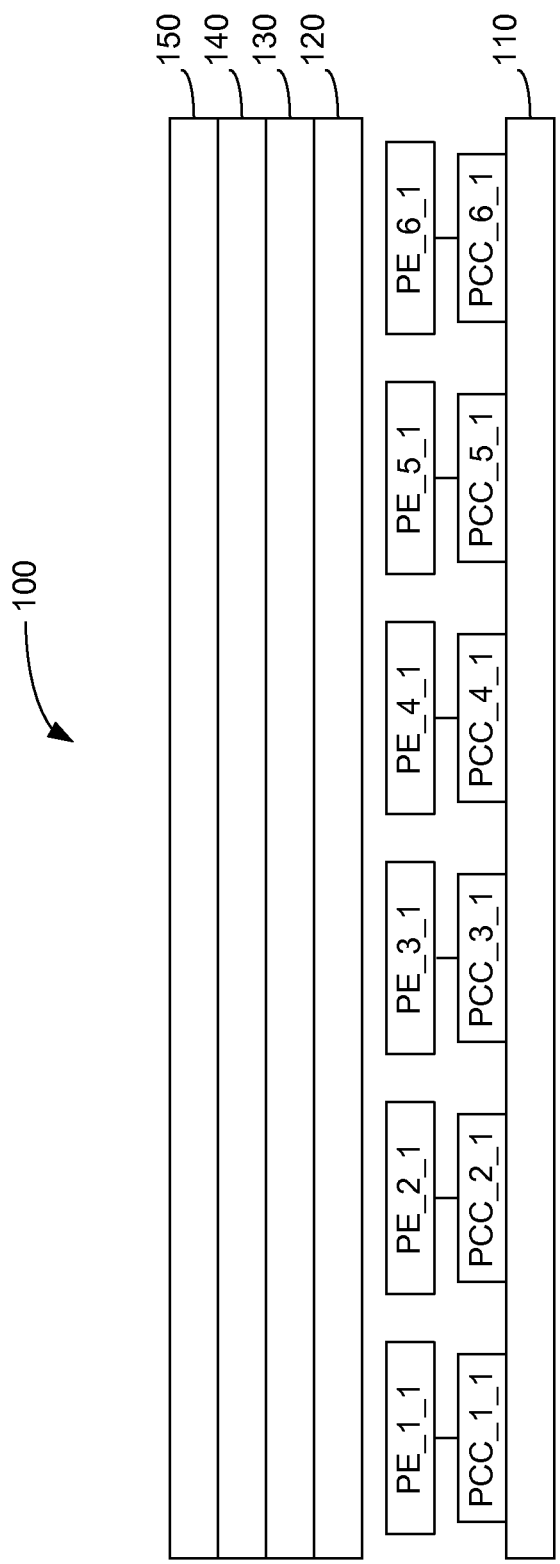
FIGS. 1A-1B illustrate a portion of a conventional LCOS display.
Figure 1B:
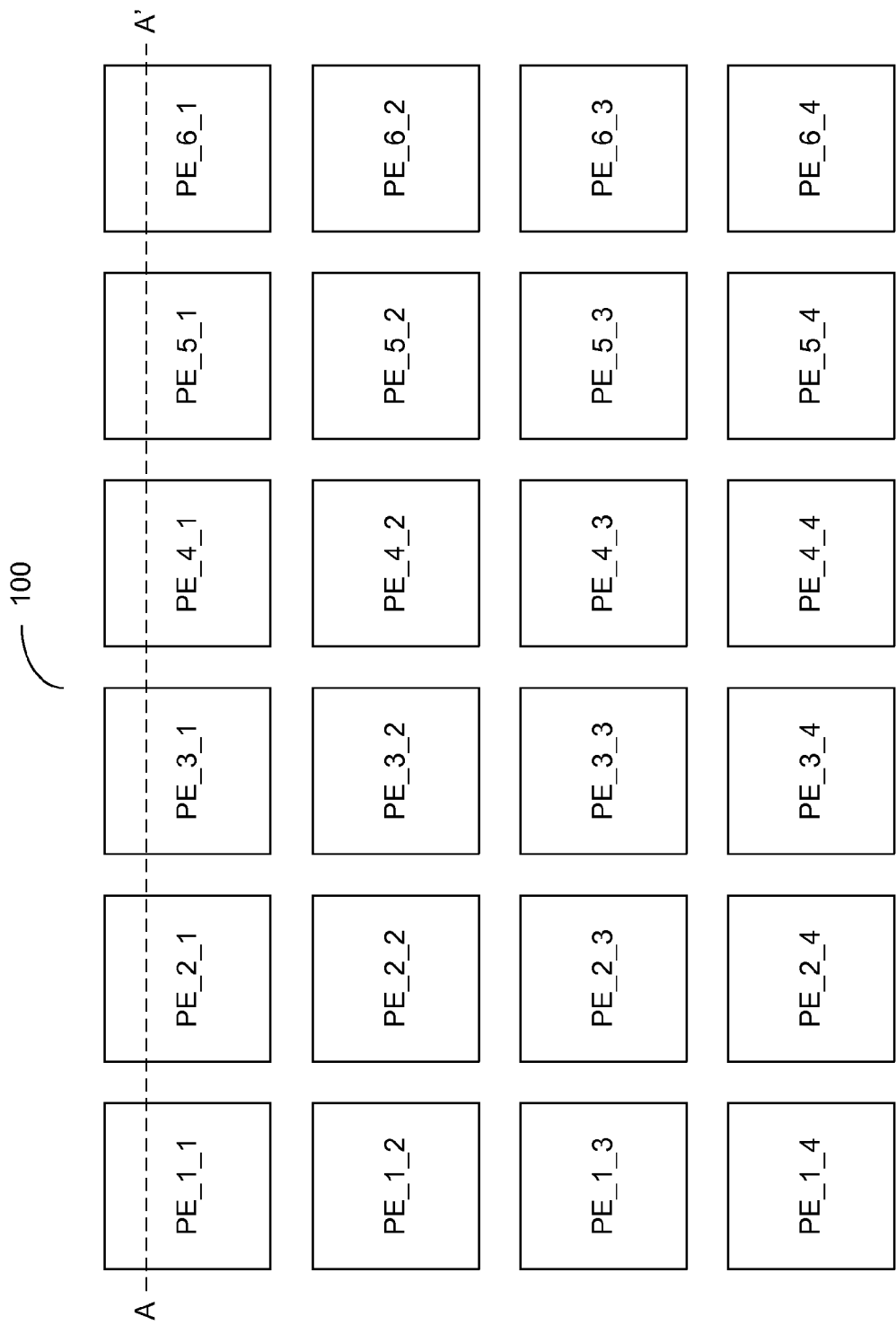
Figure 2A:
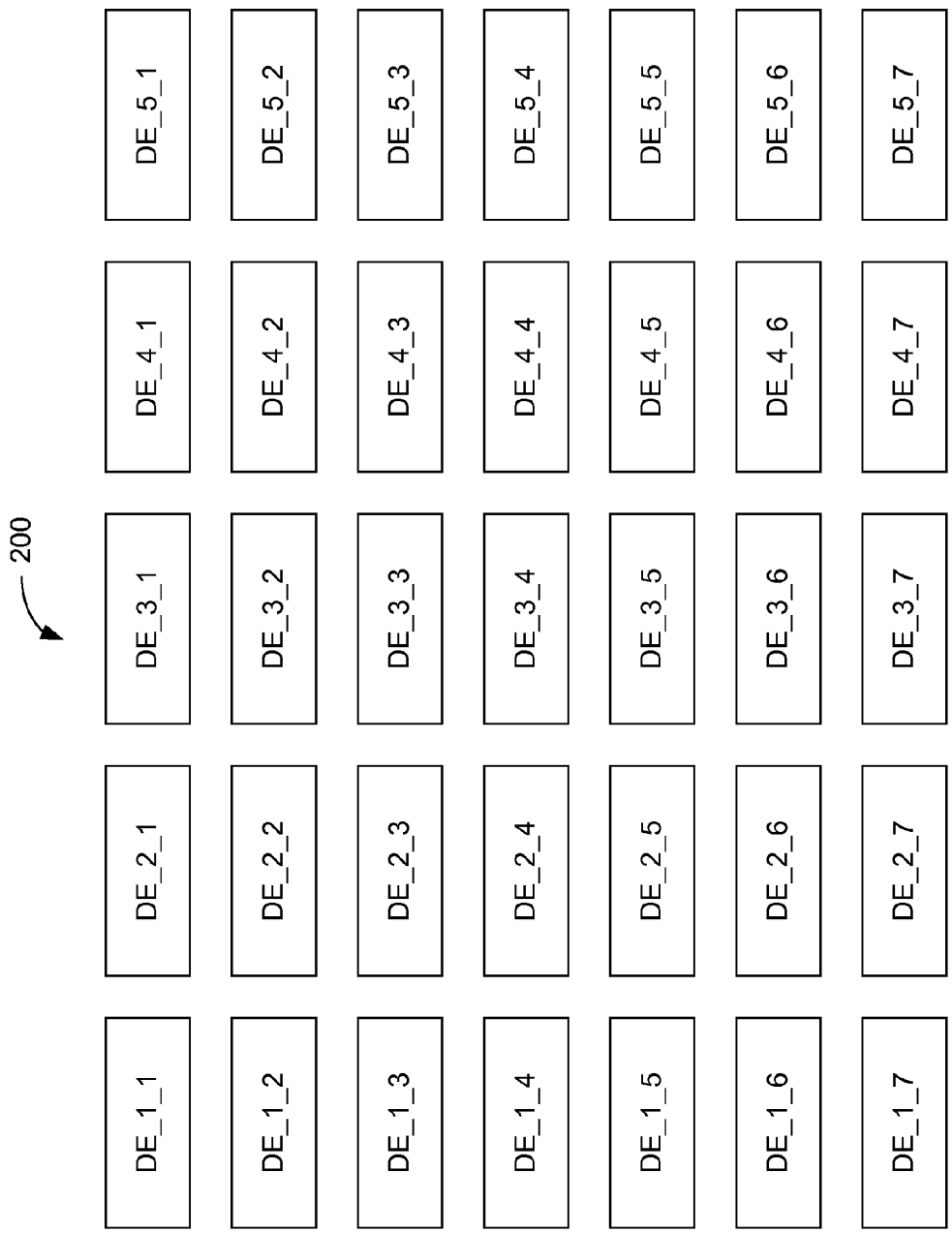
FIGS. 2A-2C is an illustration of a portion of a light modulating backplane in accordance with one embodiment of the present invention.
Figure 2B:
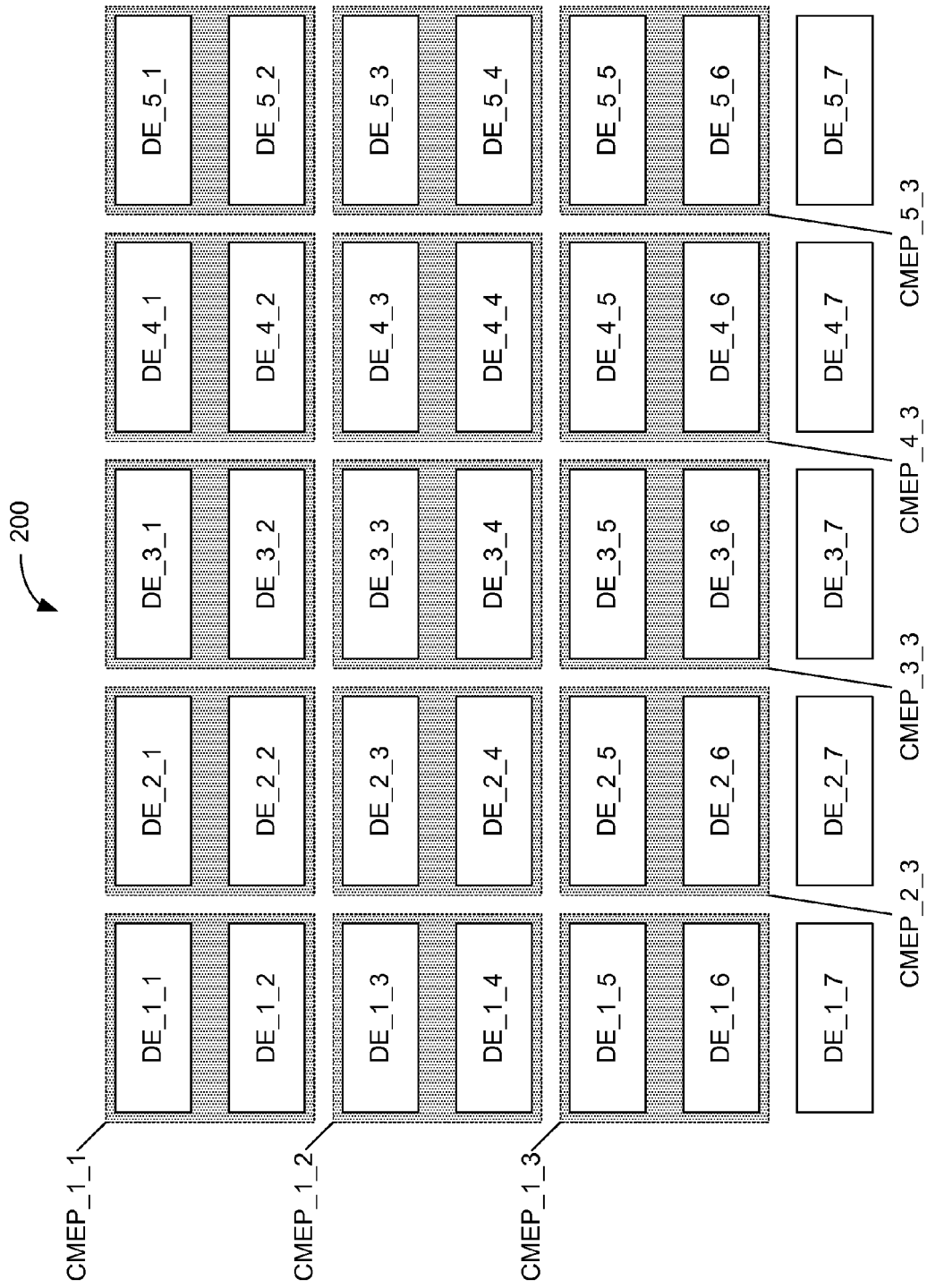
Figure 2C:
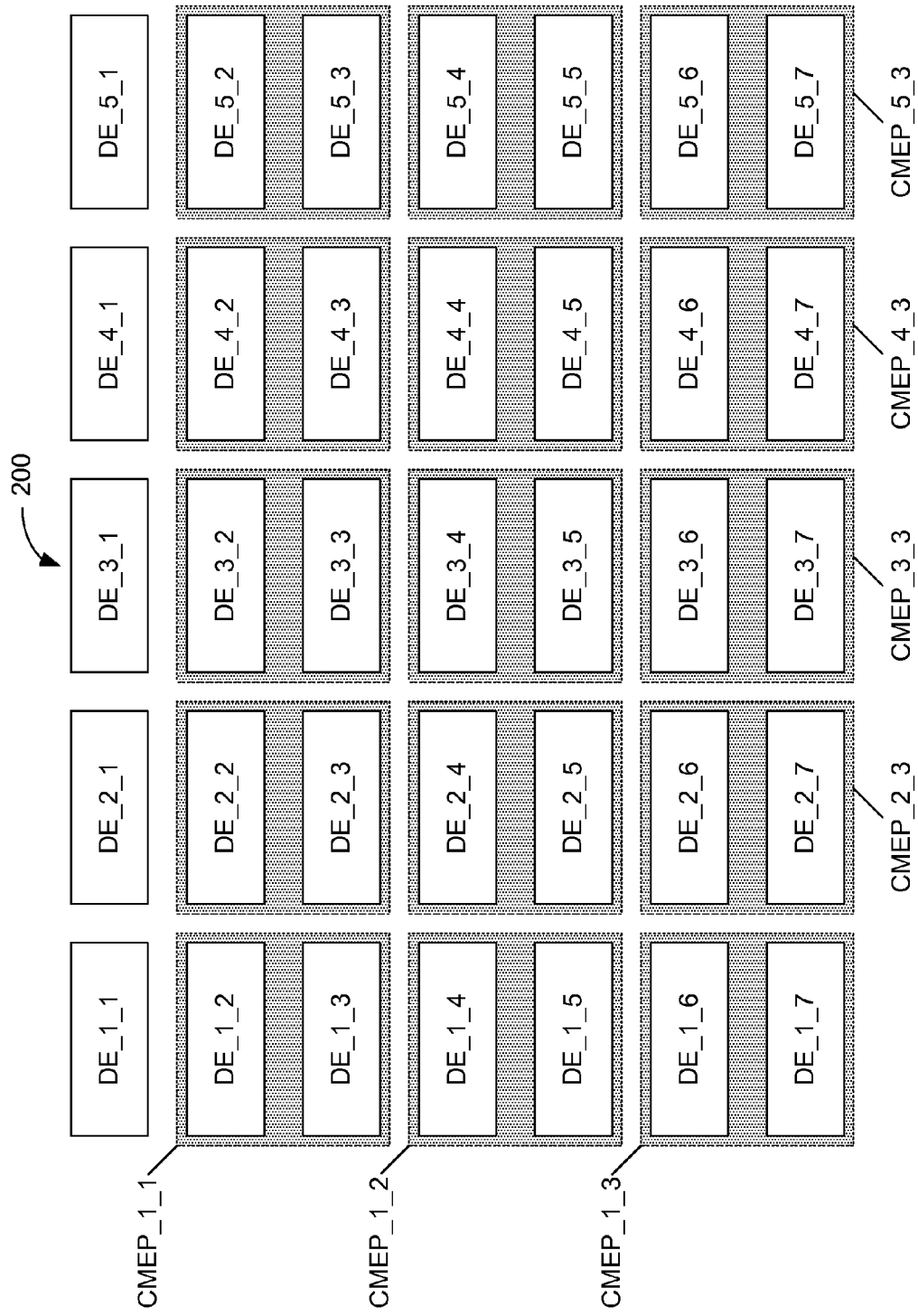

As illustrated in FIG. 2A, a light modulating backplane 200 includes a plurality of dot electrodes in a matrix. The dot electrodes are labeled DE_X_Y, where X refers to the column location of the dot electrode and Y refers to the row location of the dot electrode. FIG. 2A only shows a small portion of light modulating backplane 200. Specifically, 7 rows and 5 columns of dot electrodes are illustrated. In light modulating backplane 200, each dot electrode DE_X_Y has a rectangular shape, with a larger width than height. Light modulating backplane 200 uses novel configurable multi-electrode pixels and a bob interlacing to increase the effective resolution of light modulating backplane 200 as illustrated in FIGS. 2B and 2C. In bob interlacing, a frame of a video are converted into fields which contain only half the rows of the original frame. The fields are alternating even fields and odd fields, in which the even fields contain even rows of a frame and the odd fields contain the odd rows of a frame. The alternating fields appear to eye to be a full frame. FIG. 2B illustrates the arrangement of the configurable multi-electrode pixels during odd fields and FIG. 2C illustrates the arrangement of the configurable multi-electrode pixels during even fields. In FIG. 2B, fifteen of the configurable multi-electrode pixels are shown. To better illustrate each configurable multi-electrode pixel, the area of each configurable multi-electrode pixel is shaded; this shading is only for illustrative purposes in FIG. 2B and has no functional significance. Specifically, configurable multi-electrode pixel CMEP_1_1 include dot electrodes DE_1_1 and DE_1_2, configurable multi-electrode pixel CMEP_1_2 include dot electrodes DE_1_3 and DE_1_4, configurable multi-electrode pixel CMEP_1_3 include dot electrodes DE_1_5 and DE_1_6, configurable multi-electrode pixel CMEP_2_3 include dot electrodes DE_2_5 and DE_2_6, configurable multi-electrode pixel CMEP_3_3 include dot electrodes DE_3_5 and DE_3_6, configurable multi-electrode pixel CMEP_4_3 include dot electrodes DE_4_5 and DE_4_6, configurable multi-electrode pixel CMEP_5_3 include dot electrodes DE_5_5 and DE_5_6, and in general configurable multi-electrode pixel CMEP_X_Y includes dot electrodes DE_X_2*Y and DE_X_(2*Y−1). For even fields, as illustrated in FIG. 2C configurable multi-electrode pixel CMEP_1_1 include dot electrodes DE_1_2 and DE_1_3, configurable multi-electrode pixel CMEP_1_2 include dot electrodes DE_1_4 and DE_154, configurable multi-electrode pixel CMEP_1_3 include dot electrodes DE_1_5 and DE_1_6, configurable multi-electrode pixel CMEP_2_3 include dot electrodes DE_2_6 and DE_2_7, configurable multi-electrode pixel CMEP_3_3 include dot electrodes DE_3_6 and DE_3_7, configurable multi-electrode pixel CMEP_4_3 include dot electrodes DE_4_6 and DE_4_7, configurable multi-electrode pixel CMEP_5_3 include dot electrodes DE_5_6 and DE_5_7 and in general configurable multi-electrode pixel CMEP_X_Y includes dot electrodes DE_X_2*Y and DE_X_(2*Y+1). Thus, the rows of configurable multi-electrode pixels in FIG. 2B and FIG. 3B are vertically offset by a dot electrode. This offset improves the quality of the interlaced image to the human eye.

Figure 3:
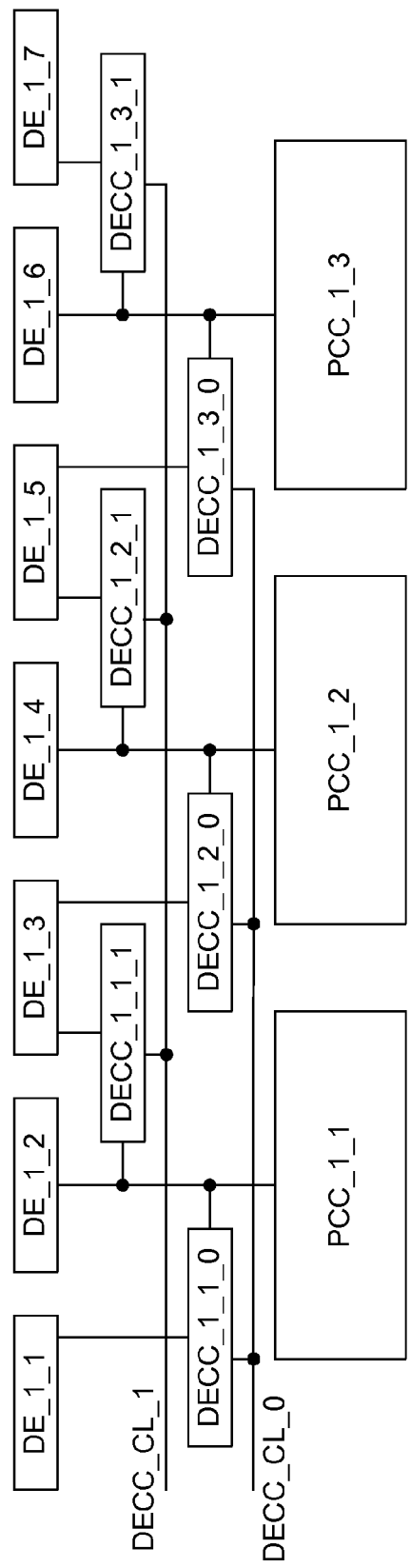
FIG. 3 is a schematic illustration of a portion of a light modulating backplane in accordance with one embodiment of the present invention.

Conventional light modulating backplanes that make use of interlacing, still include a pixel control circuit for each dot electrode. However, in light modulating backplane 200 in accordance with one embodiment of the present invention, only about half the number of pixel control circuits are used. FIG. 3 is a schematic diagram of a portion of a column of light modulating backplane 200 in accordance with one embodiment of the present invention. FIG. 3 includes pixel control circuits PCC_1_1, PCC_1_2, and PCC_1_3, dot electrodes DE_1_1, DE_1_2, DE_1_3, DE_1_4, DE_1_5, 1 DE_1_6, and DE_1_7, dot electrode connection circuits DECC_1_1_0, DECC_1_1_1, DECC_1_2_0, DECC_1_2_1, DECC_1_3_0, and DECC_1_3_1, and dot electrode connection circuit control lines DECC_CL_1_0 and DECC_CL_1_1.

Pixel control circuit PCC_1_1, which is part of configurable multi-electrode pixel CMEP_1_1 in FIGS. 2B and 2C, is coupled to dot electrode DE_1_2. Dot electrode connection circuit DECC_1_1_0 is coupled between pixel control circuit PCC_1_1 and dot electrode DE_1_1. Dot electrode connection circuit DECC_1_1_1 is coupled between pixel control circuit PCC_1_1 and dot electrode DE_1_3. For odd fields (See FIG. 2B), dot electrode connection circuit DECC_1_1_0 is put in an active state (i.e. conducting) and electrically connects dot electrode DE_1_1 to pixel control circuit PCC_1_1. Conversely, dot electrode connection circuit DECC_1_1_1 is put in an inactive state (i.e. non-conducting) and electrically isolates dot electrode DE_1_3 from pixel control circuit PCC_1_1. For even fields (see FIG. 2C), dot electrode connection circuit DECC_1_1_0 is put in the inactive state and electrically isolates dot electrode DE_1_1 from pixel control circuit PCC_1_1. Conversely, dot electrode connection circuit DECC_1_1_1 is put in the active state and electrically connects dot electrode DE_1_3 to pixel control circuit PCC_1_1.

Pixel control circuit PCC_1_2, which is part of configurable multi-electrode pixel CMEP_1_2 in FIGS. 2B and 2C, is coupled to dot electrode DE_1_4. Dot electrode connection circuit DECC_1_2_0 is coupled between pixel control circuit PCC_1_2 and dot electrode DE_1_3. Dot electrode connection circuit DECC_1_2_1 is coupled between pixel control circuit PCC_1_2 and dot electrode DE_1_5. For odd fields (See FIG. 2B), dot electrode connection circuit DECC_1_2_0 is put in an active state (i.e. conducting) and electrically connects dot electrode DE_1_3 to pixel control circuit PCC_1_2. Conversely, dot electrode connection circuit DECC_1_2_1 is put in an inactive state (i.e. non-conducting) and electrically isolates dot electrode DE_1_5 from pixel control circuit PCC_1_2. For even fields (see FIG. 2C), dot electrode connection circuit DECC_1_2_0 is put in the inactive state and electrically isolates dot electrode DE_1_3 from pixel control circuit PCC_1_2. Conversely, dot electrode connection circuit DECC_1_2_1 is put in the active state and electrically connects dot electrode DE_1_5 to pixel control circuit PCC_1_2.

Pixel control circuit PCC_1_3, which is part of configurable multi-electrode pixel CMEP_1_3 in FIGS. 2B and 2C, is coupled to dot electrode DE_1_6. Dot electrode connection circuit DECC_1_3_0 is coupled between pixel control circuit PCC_1_3 and dot electrode DE_1_5. Dot electrode connection circuit DECC_1_3_1 is coupled between pixel control circuit PCC_1_3 and dot electrode DE_1_7. For odd fields (See FIG. 2B), dot electrode connection circuit DECC_1_3_0 is put in an active state (i.e. conducting) and electrically connects dot electrode DE_1_5 to pixel control circuit PCC_1_3. Conversely, dot electrode connection circuit DECC_1_3_1 is put in an inactive state (i.e. non-conducting) and electrically isolates dot electrode DE_1_7 from pixel control circuit PCC_1_3. For even fields (see FIG. 2C), dot electrode connection circuit DECC_1_3_0 is put in the inactive state and electrically isolates dot electrode DE_1_5 from pixel control circuit PCC_1_3. Conversely, dot electrode connection circuit DECC_1_3_1 is put in the active state and electrically connects dot electrode DE_1_7 to pixel control circuit PCC_1_3.

In general, pixel control circuit PCC_X_Y, which is part of configurable multi-electrode pixel CMEP_X_Y, is coupled to dot electrode DE_X_2Y. Dot electrode connection circuit DECC_X_Y_0 is coupled between pixel control circuit PCC_X_Y and dot electrode DE_X_(2*Y−1). Dot electrode connection circuit DECC_X_Y_1 is coupled between pixel control circuit PCC_X_Y and dot electrode DE_X_(2*Y+1). For odd fields, dot electrode connection circuit DECC_X_Y_0 is put in an active state (i.e. conducting) and electrically connects dot electrode DE_X_(2*Y−1) to pixel control circuit PCC_X_Y. Conversely, dot electrode connection circuit DECC_X_Y_1 is put in an inactive state (i.e. non-conducting) and electrically isolates dot electrode DE_X_(2*Y+1) from pixel control circuit PCC_X_Y. For even fields (see FIG. 2C), dot electrode connection circuit DECC_X_Y_0 is put in the inactive state and electrically isolates dot electrode DE_X_(2*Y−1) from pixel control circuit PCC_X_Y. Conversely, dot electrode connection circuit DECC_X_Y_1 is put in the active state and electrically connects dot electrode DE_X_(2*Y+1) to pixel control circuit PCC_X_Y.

Because half of the dot electrode connection circuits are active and the other half the dot electrode connection circuits are inactive, the dot electrode connection circuits can be controlled with two control lines. Thus for the embodiment of FIG. 3, dot electrode connection circuit control line DECC_CL_1 is coupled to dot electrode connection circuits DECC_X_Y_1 and dot electrode connection circuit control line DECC_CL_0 is coupled to the dot electrode circuits DECC_X_Y_0. However in other embodiments of the present invention, different control schemes can be used with the dot electrode connection circuits. For example in some embodiments of the present invention, the dot electrode connection circuits may require more than one control line (See for example the embodiment of dot electrode connection circuit in FIG. 7). In other embodiments of the present invention, each dot electrode connection circuit is controlled by a separate control line (or control lines). In other embodiments of the present invention each row and/or column of dot electrode connection circuits are controlled by separate control lines.

In the embodiment of FIG. 3 the dot electrodes can be classified as dedicated dot electrodes and configurable dot electrodes. Specifically, dot electrodes that are coupled directly to a single pixel control circuit are dedicated dot electrodes. For example dot electrode DE_1_2 which is directly connected to pixel control circuit PCC_1_1 is a dedicated dot electrode. Conversely, dot electrodes that are coupled to multiple pixel control circuits through dot electrode connection circuits so that the dot electrode can be controlled by different pixel control circuits are configurable dot electrodes. For example dot electrode DE_1_3 which can be controlled by either pixel control circuit PCC_1_1 (through dot electrode connection circuit DECC_1_1_1) or pixel control circuit PCC_1_2 (through dot electrode connection circuit DECC_1_2_0) is a configurable dot electrode. However, other embodiments of the present invention may made without dedicated dot electrodes.

Figure 4A:
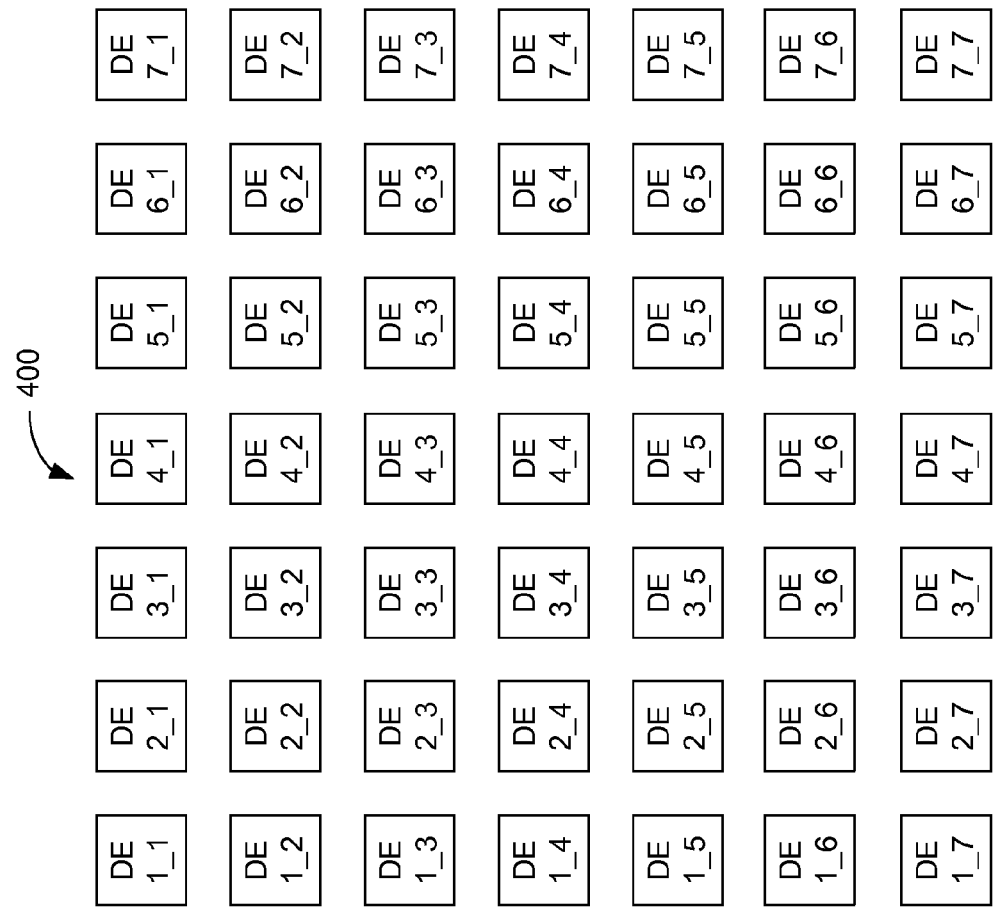
FIGS. 4A-4E is an illustration of a portion of a light modulating backplane in accordance with one embodiment of the present invention.
Figure 4B:
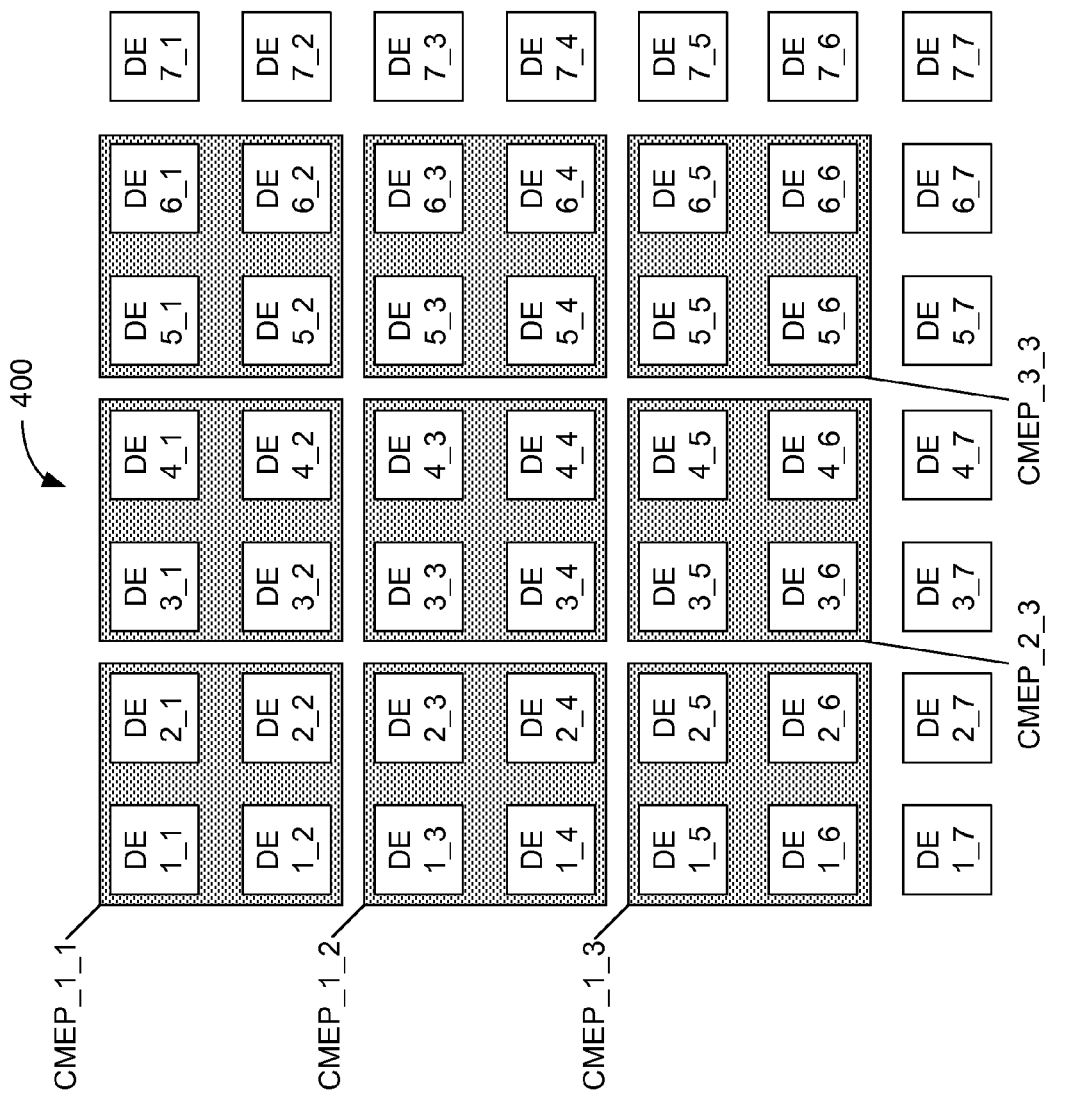
Figure 4C:
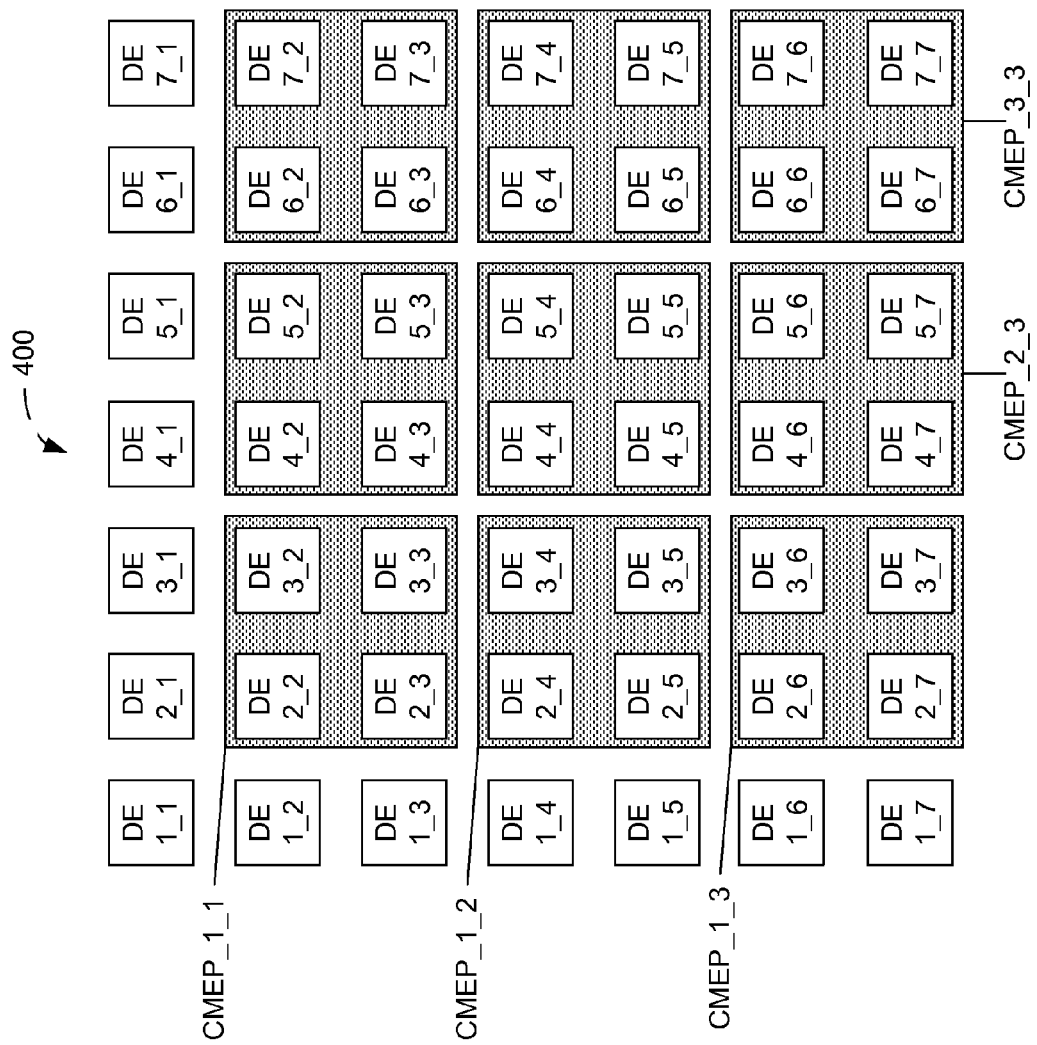

FIG. 4A shows a small portion of a light modulating backplane 400 in accordance with another embodiment of the present invention. Specifically, 7 rows and 7 columns of dot electrodes are illustrated. In light modulating backplane 400, each dot electrode DE_X_Y has a square shape. Light modulating backplane 400 uses novel configurable multi-electrode pixels and a quincunx interlacing to increase the effective resolution of light modulating backplane 400 as illustrated in FIGS. 4B and 4C. In quincunx interlacing, a frame of a video are converted into fields which contain only half the rows and half the columns of the original frame. The fields are, alternating even fields and odd fields, in which the even fields contain even rows and even columns of a frame and the odd fields contain the odd rows and odd columns of a frame. The alternating fields appear to eye to be a full frame. FIG. 4B illustrates the arrangement of the configurable multi-electrode pixels during odd fields and FIG. 4C illustrates the arrangement of the configurable multi-electrode pixels during even fields. In FIG. 4B, nine of the configurable multi-electrode pixels are shown. To better illustrate each configurable multi-electrode pixel, the area of each configurable multi-electrode pixel is shaded; this shading is only for illustrative purposes in FIG. 4B and has no functional significance. Specifically, configurable multi-electrode pixel CMEP_1_1 include dot electrodes DE_1_1, DE_2_1, DE_1_2, and DE_2_2. Configurable multi-electrode pixel CMEP_1_2 includes dot electrodes DE_1_3, DE_2_3, DE_1_4, and DE_2_4. Configurable multi-electrode pixel CMEP_1_3 include dot electrodes DE_1_5, DE_2_5, DE_1_6, and DE_2_6. Configurable multi-electrode pixel CMEP_2_3 includes dot electrodes DE_3_5, DE_4_5, DE_3_6, and DE_4_6. Configurable multi-electrode pixel CMEP_3_3 includes dot electrodes DE_5_5, DE_6_5, DE_5_6, and DE_6_6. In general a configurable multi-electrode pixel CMEP_X_Y includes dot electrodes DE_(2*X−1)_(2*Y−1), DE_(2*X)_(2*Y−1), DE_(2*X−1)_(2*Y), and DE_(2*X)_(2*Y).

For even fields, as illustrated in FIG. 4C configurable multi-electrode pixel CMEP_1_1 include dot electrodes DE_2_2, DE_3_2, DE_2_3, and DE_3_3. Configurable multi-electrode pixel CMEP_1_2 includes dot electrodes DE_2_4, DE_3_4, DE_2_5, and DE_3_5. Configurable multi-electrode pixel CMEP_1_3 includes dot electrodes DE_2_6, DE_3_6, DE_2_7, and DE_3_7. Configurable multi-electrode pixel CMEP_2_3 include dot electrodes DE_4_6, DE_5_6, DE_4_7, and DE_5_7. Configurable multi-electrode pixel CMEP_3_3 includes dot electrodes DE_6_6, DE_7_6, DE_6_7, and DE_7_7. In general a configurable multi-electrode pixel CMEP_X_Y includes dot electrodes DE_(2*X)_(2*Y), DE_(2*X+1)_(2*Y), DE_(2*X)_(2*Y+1), and DE_(2*X+1)_(2*Y+1). Thus, the rows of configurable multi-electrode pixels in FIG. 4B and FIG. 4C are vertically offset by a dot electrode and horizontally offset by a dot electrode. This offset improves the quality of the interlaced image to the human eye.

Figure 4D:
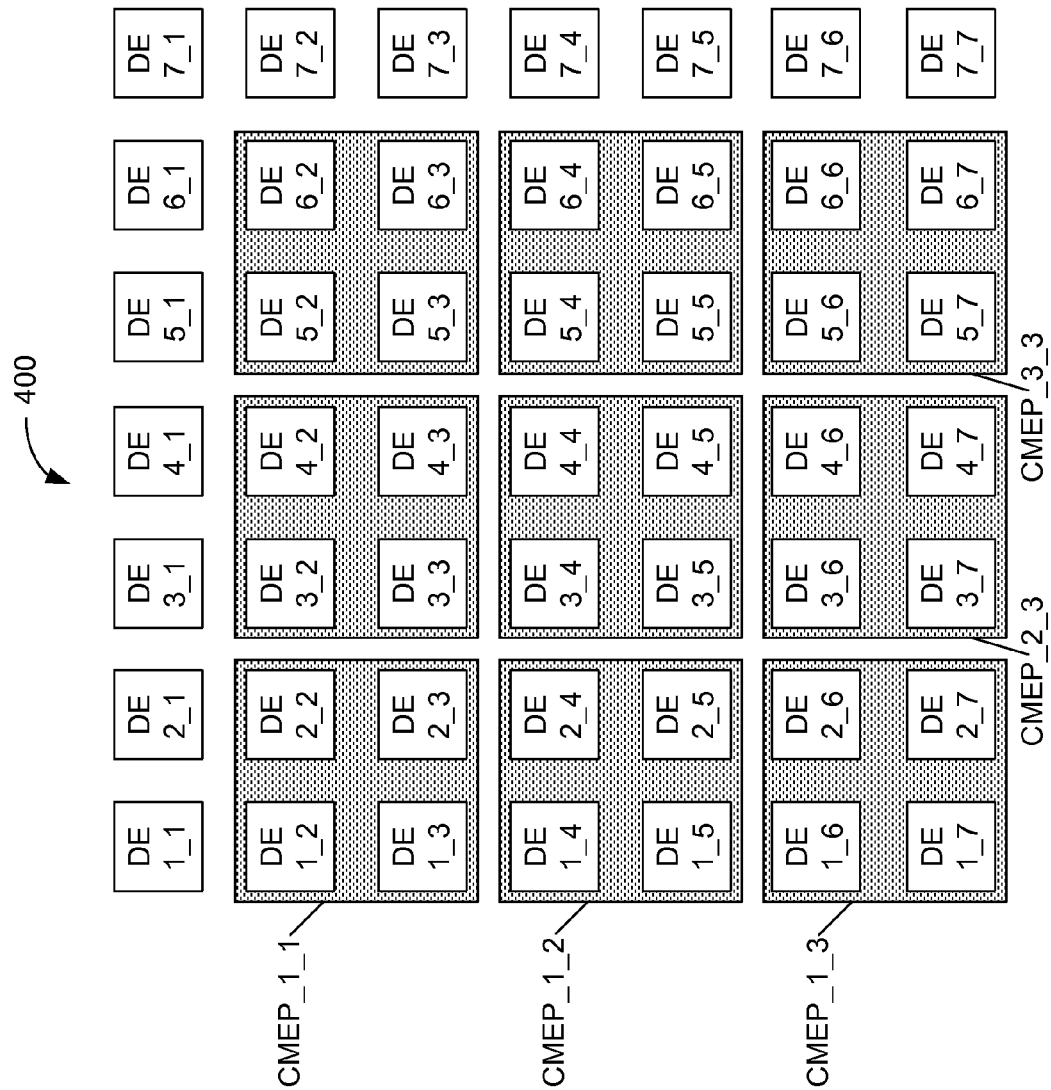
Figure 4E:
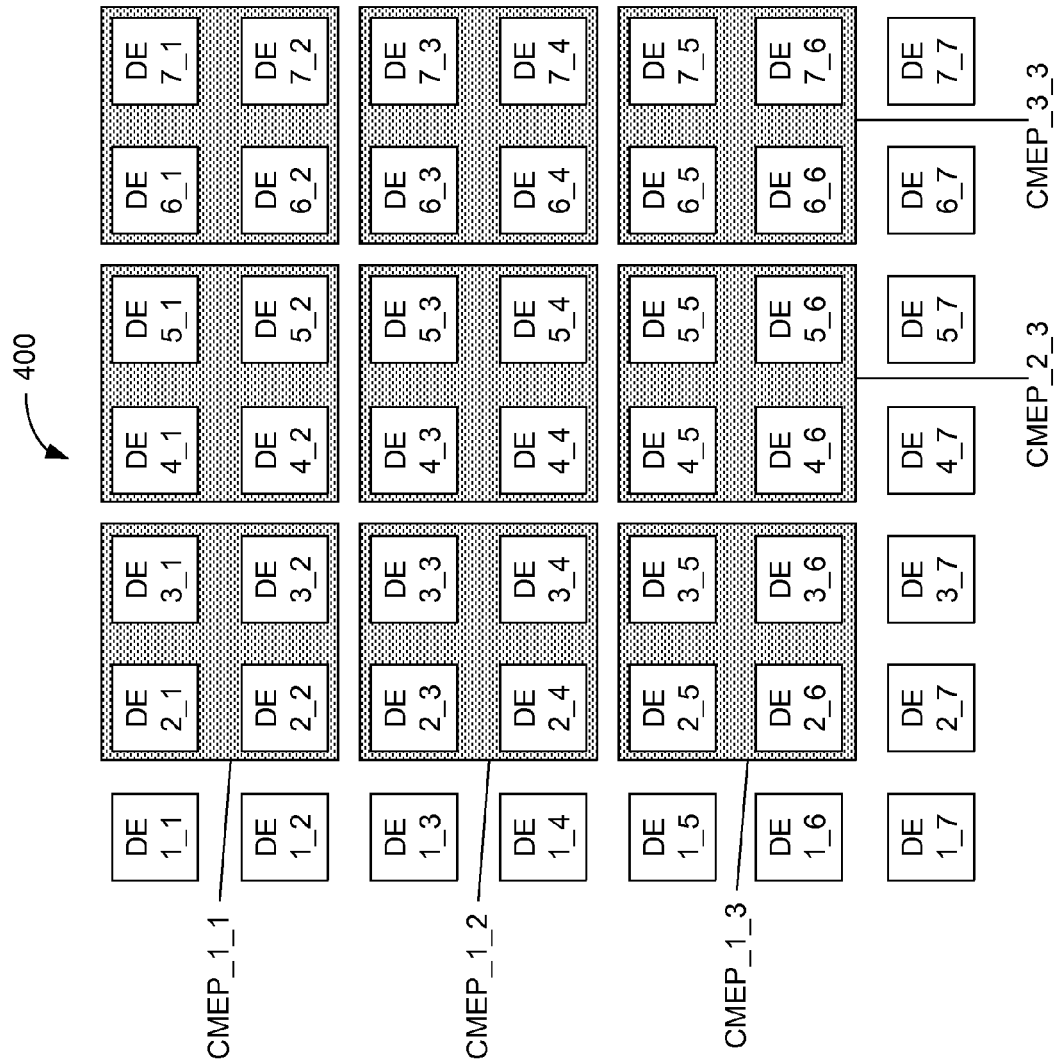

In some embodiments of the present invention, other arrangement of dot electrodes are also used in light modulating backplane 400. FIGS. 4D and 4E illustrate other arrangements of the configurable multi-electrode pixels. In FIG. 4D, nine of the configurable multi-electrode pixels are shown. To better illustrate each configurable multi-electrode pixel, the area of each configurable multi-electrode pixel is shaded; this shading is only for illustrative purposes in FIG. 4D and has no functional significance. Specifically, configurable multi-electrode pixel CMEP_1_1 include dot electrodes DE_1_2, DE_2_2, DE_1_3, and DE_2_3. Configurable multi-electrode pixel CMEP_1_2 includes dot electrodes DE_1_4, DE_2_4, DE_1_5, and DE_2_5. Configurable multi-electrode pixel CMEP_1_3 include dot electrodes DE_1_6, DE_2_6, DE_1_7, and DE_2_7. Configurable multi-electrode pixel CMEP_2_3 includes dot electrodes DE_3_6, DE_4_6, DE_3_7, and DE_4_7. Configurable multi-electrode pixel CMEP_3_3 includes dot electrodes DE_5_6, DE_6_6, DE_5_7, and DE_6_7. In general a configurable multi-electrode pixel CMEP_X_Y includes dot electrodes DE_(2*X−1)_(2*Y), DE_(2*X)_(2*Y), DE_(2*X−1)_(2*Y+1), and DE_(2*X)_(2*Y+1).

In FIG. 4E configurable multi-electrode pixel CMEP_1_1 include dot electrodes DE_2_1, DE_3_1, DE_2_2, and DE_3_2. Configurable multi-electrode pixel CMEP_1_2 includes dot electrodes DE_2_3, DE_3_3, DE_2_4, and DE_3_4. Configurable multi-electrode pixel CMEP_1_3 includes dot electrodes DE_2_5, DE_3_5, DE_2_6, and DE_3_6. Configurable multi-electrode pixel CMEP_2_3 include dot electrodes DE_4_5, DE_5_5, DE_4_6, and DE_5_6. Configurable multi-electrode pixel CMEP_3_3 includes dot electrodes DE_6_5, DE_7_5, DE_6_6, and DE_7_6. In general a configurable multi-electrode pixel CMEP_X_Y includes dot electrodes DE_(2*X)_(2*Y−1), DE_(2*X+1)_(2*Y−1), DE_(2*X)_(2*Y), and DE_(2*X+1)_(2*Y). Like the multi-electrode pixels of FIGS. 4B and 4C, the rows of configurable multi-electrode pixels in FIG. 4D and FIG. 4E are vertically offset by a dot electrode and horizontally offset by a dot electrode. Thus, the configurable multi-electrode pixels in FIG. 4D and FIG. 4E could be used for quincunx interlacing. Furthermore, some embodiments of the present invention can make use of all four arrangements of configurable multi-electrode pixels to display a video stream.

Figure 5A:
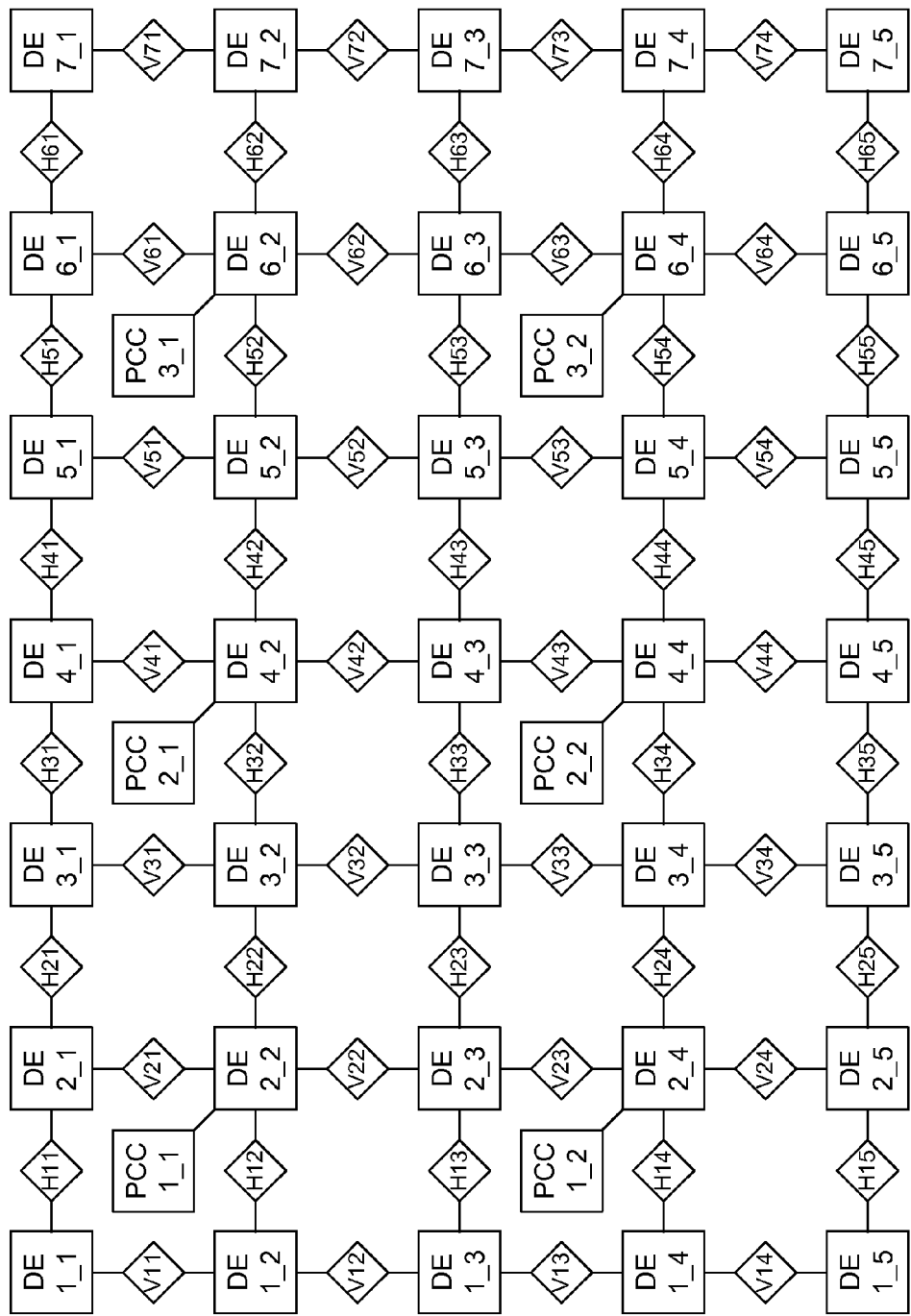
FIGS. 5A-5E is a schematic illustration of a portion of a light modulating backplane in accordance with one embodiment of the present invention.

In light modulating backplane 400 in accordance with one embodiment of the present invention, one pixel control circuit is used to control four dot electrodes at a time. FIG. 5A is a schematic diagram of a portion of light modulating backplane 400 in accordance with one embodiment of the present invention. FIG. 5A includes pixel control circuits PCC_1_1, PCC_1_2, PCC_2_1, PCC_2_2, PCC_3_1, and PCC_3_2; dot electrodes DE_1_1, DE_1_2, DE_1_3, DE_1_4, DE_1_5, DE_2_1, . . . DE_7_4, and DE_7_5; dot electrode connection circuit DECC_H_1_1, DECC_H_1_2, DECC_H_1_3, DECC_H_1_4, DECC_H_1_5, DECC_H_2_1, . . . DECC_H_7_3, and DECC_H_7_4; and dot electrode connection circuit DECC_V_1_1, DECC_V_1_2, DECC_V_1_3, DECC_V_1_4, DECC_H_2_1, . . . DECC_H_6_4, and DECC_H_6_5. Due to space constraints in FIG. 5A, each dot electrode connection circuit DECC_H_X_Y is drawn as a diamond and labeled as HXY, similarly each dot electrode connection circuit DECC_V_X_Y is drawn as a diamond and labeled as VXY. In actual implementation, the dot electrodes would be on a first plane overlying the pixel control circuits and dot electrode connection circuits. In addition due to space constraints the control lines for the dot electrode connection circuits are omitted. For clarity, FIGS. 5B, 5C, 5D, and 5E are included to illustrate the state of the dot electrode connection circuits for the configurable multi-electrode pixels of FIG. 5B, FIG. 5C, FIG. 5D, and FIG. 5E, respectively. Specifically, in FIGS. 5B, 5C, 5D and 5E dot electrode connection circuits in the active state (i.e. conducting) are shaded while the dot electrode connection circuits in the inactive state (i.e. non-conducting) are not shaded. Furthermore, configurable multi-electrode pixels are marked by large squares in FIGS. 5B and 5C.

Figure 5B:
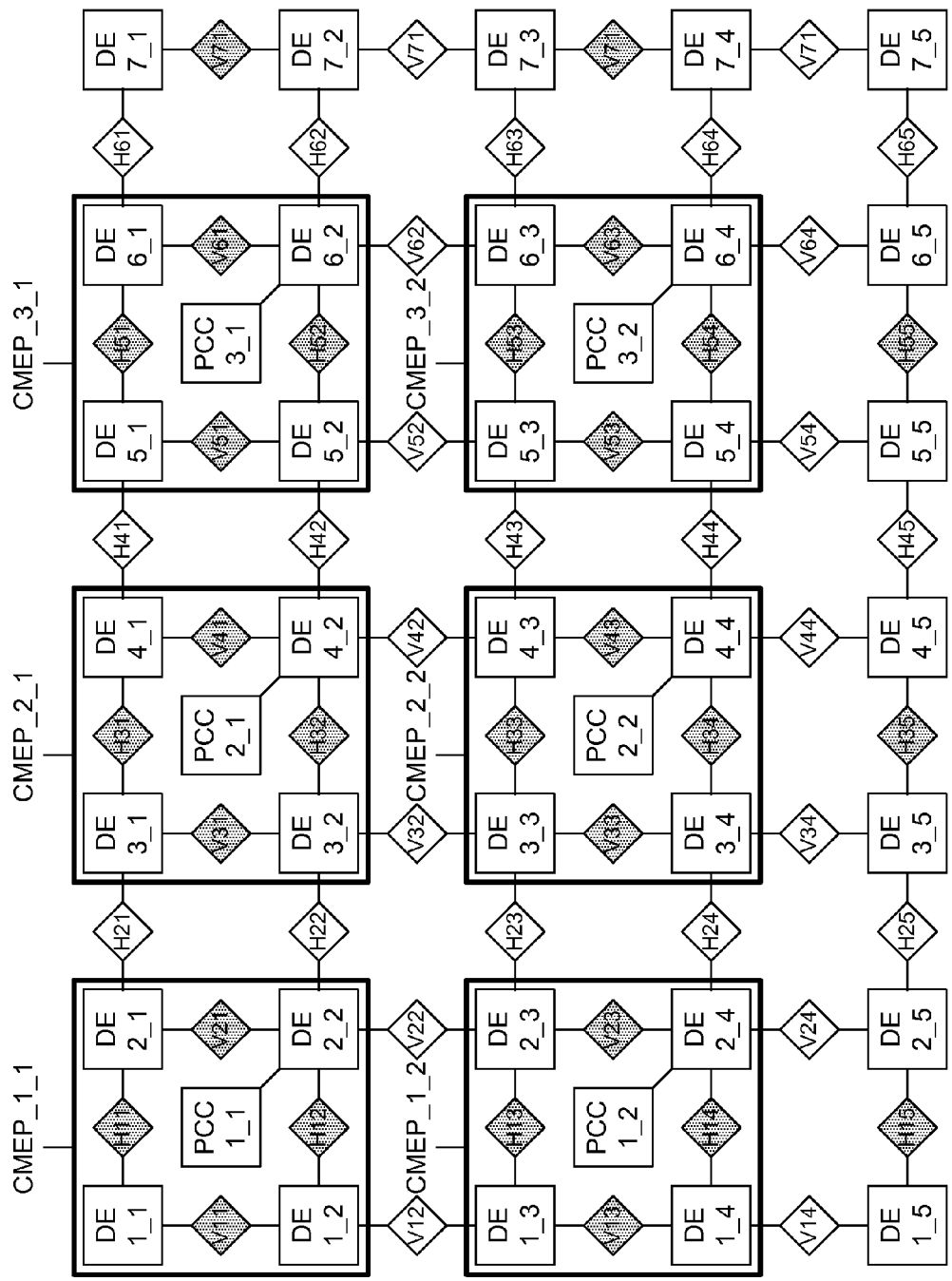
Figure 5C:
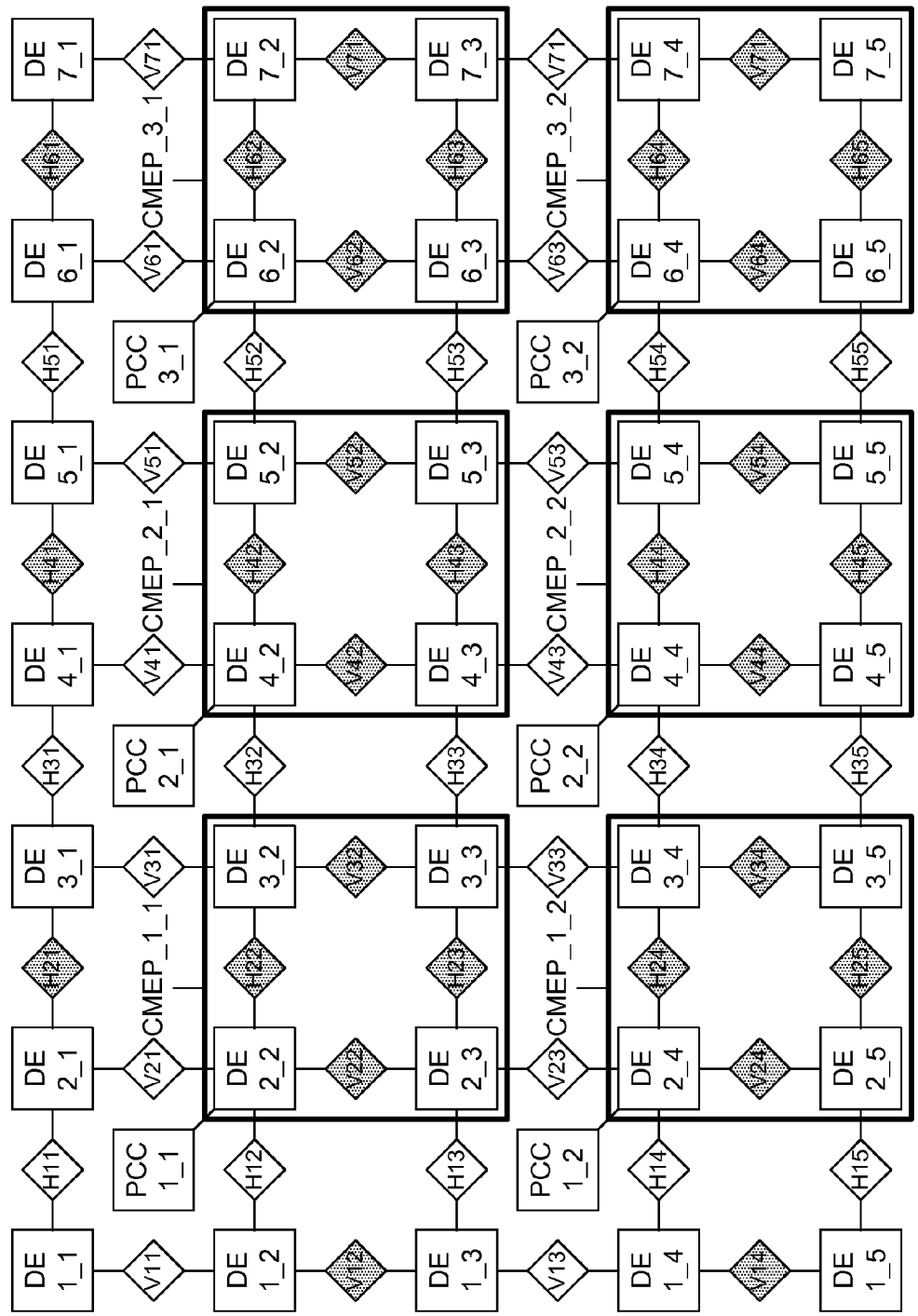

Pixel control circuit PCC_1_1, which is part of configurable multi-electrode pixel CMEP_1_1 in FIGS. 4B, 4C, 4D and 4E, is coupled to dot electrode DE_2_2. Dot electrode connection circuit DECC_V_2_1 is coupled between dot electrode DE_2_2 and dot electrode DE_2_1. Dot electrode connection circuit DECC_H_1_2 is coupled between dot electrode DE_2_2 and dot electrode DE_1_2. Dot electrode connection circuit DECC_H_1_1 is coupled between dot electrode DE_2_1 and dot electrode DE_1_1. Dot electrode connection circuit DECC_V_1_1 is coupled between dot electrode DE_1_2 and dot electrode DE_1_1. Dot electrode connection circuit DECC_V_2_2 is coupled between dot electrode DE_2_2 and dot electrode DE_2_3. Dot electrode connection circuit DECC_H_2_2 is coupled between dot electrode DE_2_2 and dot electrode DE_3_2. Dot electrode connection circuit DECC_H_2_3 is coupled between dot electrode DE_2_3 and dot electrode DE_3_3. Dot electrode connection circuit DECC_V_3_2 is coupled between dot electrode DE_3_2 and dot electrode DE_3_3. As shown in FIG. 5B, for odd fields, dot electrode connection circuits DECC_H_1_1, DECC_H_1_2, DECC_V_1_1, and DECC_V_2_1 are all set to the active state (i.e. conducting) allowing pixel control circuit PCC_1_1 to control dot electrodes DE_1_1, DE_2_1, DE_1_2, and DE_2_2. As shown in FIG. 5C, for even fields, dot electrode connection circuits DECC_H_2_2, DECC_H_2_3, DECC_V_2_2, and DECC_V_3_2 are all set to the active state (i.e. conducting) allowing pixel control circuit PCC_1_1 to control dot electrodes DE_2_2, DE_3_2, DE_2_3, and DE_3_3.

Pixel control circuit PCC_2_1, which is part of configurable multi-electrode pixel CMEP_2_1 in FIGS. 5B, 5C, 5D, and 5E, is coupled to dot electrode DE_4_2. Dot electrode connection circuit DECC_V_4_1 is coupled between dot electrode DE_4_2 and dot electrode DE_4_1. Dot electrode connection circuit DECC_H_3_2 is coupled between dot electrode DE_4_2 and dot electrode DE_3_2. Dot electrode connection circuit DECC_H_3_1 is coupled between dot electrode DE_4_1 and dot electrode DE_3_1. Dot electrode connection circuit DECC_V_3_1 is coupled between dot electrode DE_3_2 and dot electrode DE_3_1. Dot electrode connection circuit DECC_V_4_2 is coupled between dot electrode DE_4_2 and dot electrode DE_4_3. Dot electrode connection circuit DECC_H_4_2 is coupled between dot electrode DE_4_2 and dot electrode DE_5_2. Dot electrode connection circuit DECC_H_4_3 is coupled between dot electrode DE_4_3 and dot electrode DE_5_3. Dot electrode connection circuit DECC_V_5_2 is coupled between dot electrode DE_5_2 and dot electrode DE_5_3. As shown in FIG. 5B, for odd fields, dot electrode connection circuits DECC_H_3_1, DECC_H_3_2, DECC_V_3_1, and DECC_V_4_1 are all set to the active state (i.e. conducting) allowing pixel control circuit PCC_2_1 to control dot electrodes DE_3_1, DE_4_1, DE_3_2, and DE_4_2. As shown in FIG. 5C, for even fields, dot electrode connection circuits DECC_H_4_2, DECC_H_4_3, DECC_V_4_2, and DECC_V_5_2 are all set to the active state (i.e. conducting) allowing pixel control circuit PCC_2_1 to control dot electrodes DE_4_2, DE_5_2, DE_4_3, and DE_5_3.

In general, each dot electrode connection circuit DECC_H_X_Y is coupled between dot electrode DE_X_Y and dot electrode DE_X+1_Y. Each dot electrode connection circuit DECC_V_X_Y is coupled between dot electrode DE_X_Y and dot electrode DE_X_Y+1. Dot electrode pixel control circuit PCC_X_Y is coupled to dot electrode DE_2*X_2*Y.

For the arrangement of FIG. 5B which corresponds with FIG. 4B, dot electrode connection circuits DECC_H_X_Y is active if X is an odd number. Conversely, dot electrode connection circuits DECC_V_X_Y is active if Y is an odd number. Thus, for the arrangement of FIG. 5B each pixel control circuit PCC_X_Y control dot electrodes DE_2*X_2*Y, DE_(2*X−1)_2*Y, DE_2*X_(2*Y−1), and DE_(2*X−1)_(2*Y−1).

For the arrangement of FIG. 5C, which corresponds with FIG. 4C, dot electrode connection circuits DECC_H_X_Y is active if X is an even number. Conversely, dot electrode connection circuits DECC_V_X_Y is active if Y is an even number. Thus, for the arrangement of FIG. 5C each pixel control circuit PCC_X_Y control dot electrodes DE_2*X_2*Y, DE_(2*X+1)_2*Y, DE_2*X_(2*Y+1), and DE_(2*X+1)_(2*Y+1).

Figure 5D:
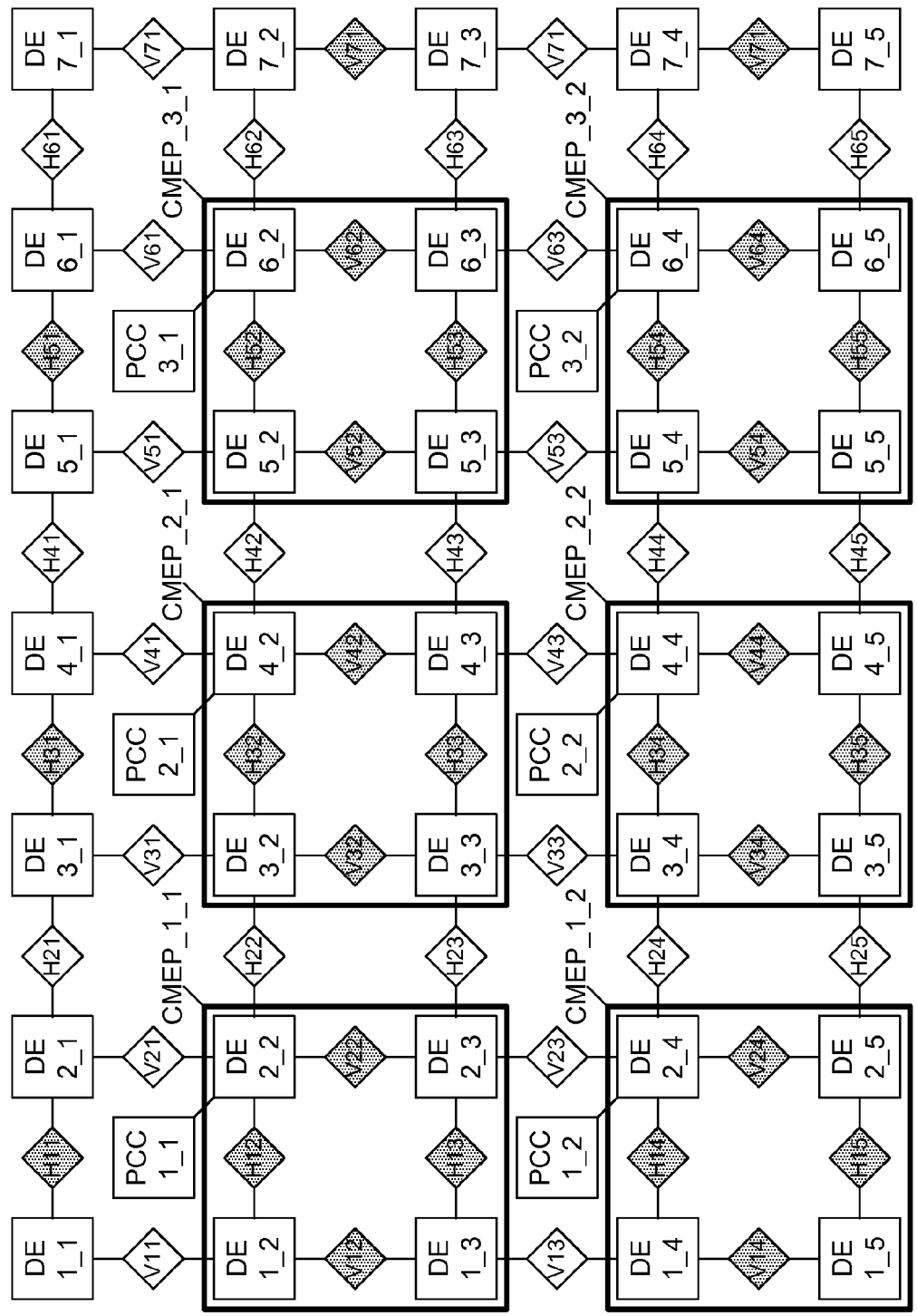

For the arrangement of FIG. 5D which corresponds with FIG. 4D, dot electrode connection circuits DECC_H_X_Y is active if X is an odd number. Conversely, dot electrode connection circuits DECC_V_X_Y is active if Y is an even number. Thus, for the arrangement of FIG. 5D each pixel control circuit PCC_X_Y control dot electrodes DE_(2*X−1)_2*Y, DE_2*X_2*Y, DE_(2*X−1)_(2*Y+1), and DE_(2*X)_(2*Y+1).

Figure 5E:
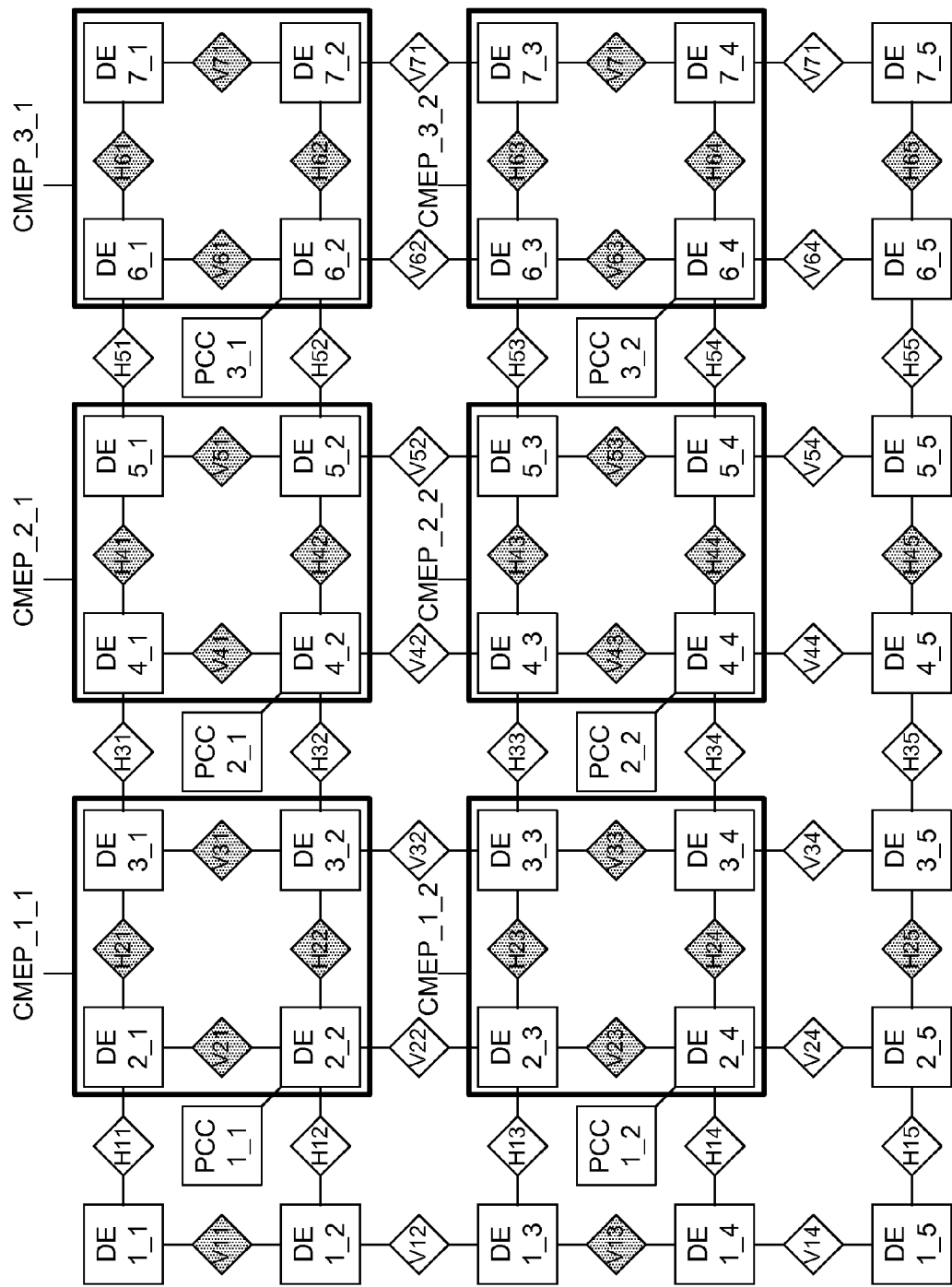

For the arrangement of FIG. 5E which corresponds with FIG. 4E, dot electrode connection circuits DECC_H_X_Y is active if X is an even number. Conversely, dot electrode connection circuits DECC_V_X_Y is active if Y is an odd number. Thus, for the arrangement of FIG. 5D each pixel control circuit PCC_X_Y control dot electrodes DE_(2*X−1)_2*Y, DE_2*X_2*Y, DE_(2*X−1)_(2*Y+1), and DE_(2*X)_(2*Y+1).

In one embodiment of the present invention, two state control lines are routed to each of the dot electrode control circuits. The state control lines indicate which of the four arrangements of configurable multi-electrode pixels should be used (as illustrated by FIGS. 5B-5E). Each dot electrode control circuit includes a small decoding circuit to determine whether to be active or inactive.

Figure 8:
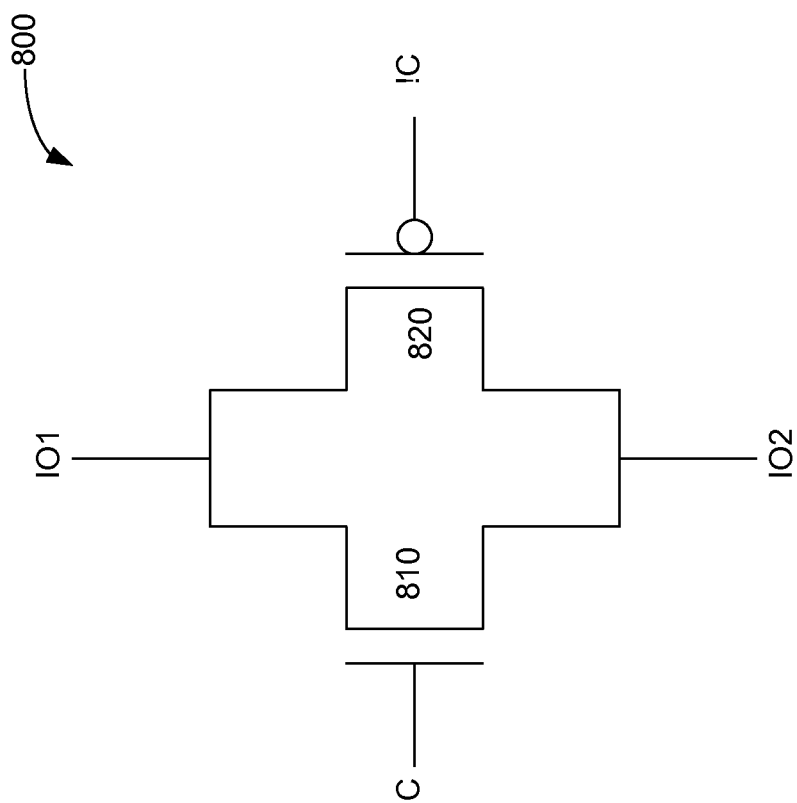
FIG. 8 is schematic diagram of a dot electrode connection circuit in accordance with one embodiment of the present invention.

However, in other embodiments of the present invention, including a decoding circuit in each dot electrode connection circuit would require to much area. Therefore, in one embodiment of the present invention that uses dot electrode control circuit 800, which is illustrated in FIG. 8, complementary control lines are selectively routed to the dot electrode connection circuits so that no decoding unit is required. As explained in more detail below, the dot electrode control circuit in FIG. 8 has a two control terminals C and !C. If logic high is provided on control terminal C and logic low is provided on control terminal !C, dot electrode control circuit 800 is active; otherwise, dot electrode control circuit 800 is inactive.

In this embodiment, two complementary pair of control lines are used. For consistency, control lines V_CNTRL and !V_CNTRL are used with dot electrode connection circuits DECC_V_X_Y and control lines H_CNTRL and !HCNTRL are used with dot electrode connection circuits DECC_H_X_Y. Specifically for a dot electrode control circuit DECC_V_X_Y, when Y is odd then control line V_CNTRL is coupled to control terminal C and control line !V_CNTRL is coupled to control terminal !C. However when Y is even then control line V_CNTRL is coupled to control terminal !C and control line !V_CNTRL is coupled to control terminal C. Thus, when control line V_CNTRL is at logic high, then dot electrode connection circuit DECC_V_X_Y is active if Y is odd and inactive if Y is even. However when control line V_CNTRL is at logic low, then electrode connection circuit DECC_V_X_Y is inactive if Y is odd and inactive is even.

For a dot electrode control circuit DECC_H_X_Y, when X is odd, then control line H_CNTRL is coupled to control terminal C and control line !H_CNTRL is coupled to control line !C. However when X is odd then control line H_CNTRL is coupled to control terminal !C and control line !H_CNTRL is coupled to control terminal C. Thus, when control line H_CNTRL is at logic high then dot electrode connection circuit DECC_H_X_Y is active if X is odd and inactive if X is even.

When control line V_CNTRL is logic high and control line H_CNTRL is logic high then the arrangement shown in FIG. 5B is selected. When control line V_CNTRL is logic low and control line H_CNTRL is logic low then the arrangement shown in FIG. 5C is selected. When control line V_CNTRL is logic low and control line V_CNTRL is logic high then the arrangement shown in FIG. 5D is selected. When control line V_CNTRL is logic high and control line V_CNTRL is logic low then the arrangement shown in FIG. 5E is selected.

For Quincunx interlacing only two of the arrangements shown in FIGS. 5B-5E are used. Specifically, one embodiment of the present invention uses the arrangement of FIG. 5B and FIG. 5C. In FIG. 5B and FIG. 5O half of the dot electrode connection circuits are active and the other half the dot electrode connection circuits are inactive, the dot electrode connection circuits can be controlled with two control lines. Thus for the embodiment of FIG. 5A-5C, a first dot electrode connection circuit control line can be coupled to dot electrode connection circuits DECC_H_X_Y, where X is odd and to dot electrode connection circuits DECC_V_X_Y, where Y is odd. A second dot electrode connection circuit control line is coupled to dot electrode connection circuits DECC_H_X_Y, where X is even and to dot electrode connection circuits DECC_V_X_Y, where Y is even. However in other embodiments of the present invention, different control schemes can be used with the dot electrode connection circuits. For example in some embodiments of the present invention, the dot electrode connection circuits may require more than one control line (See for example the embodiment of dot electrode connection circuit in FIG. 7). In other embodiments of the present invention, each dot electrode connection circuit is controlled by a separate control line (or control lines).

Furthermore, since only two of the configurable multi-electrode pixel arrangements are used for quincunx interlacing some of the dot electrode connection circuits are redundant and unnecessary. In FIG. 5B, dot electrode DE_1_2 is coupled to pixel control circuit PCC_1_1 through two paths. The first path connecting dot electrode DE_1_2 to pixel control circuit PCC_1_1 is through dot electrode connection circuit DECC_H_1_2 and dot electrode DE_2_2. The second path connecting dot electrode DE_1_2 to pixel control circuit PCC_1_1 is through dot electrode connection circuit DECC_V_1_1, dot electrode DE_1_1, dot electrode connection circuit DECC_H_1_1, dot electrode DE_2_1, dot electrode connection circuit DECC_V_2_1, and dot electrode DE_2_2. Therefore, dot electrode connection circuit DECC_H_1_2 can be eliminated without changing the functionality of the embodiment of FIGS. 5A-5C. In fact all dot electrodes connection circuits DECC_H_X_Y, where Y is even can be eliminated. Thus some embodiments of the present invention would eliminate these redundant circuits reduce the cost of light modulating backplane. Due to the symmetrical nature of the embodiment of FIG. 5A-5C, other dot electrode connection circuits could be eliminated instead.

Figure 6A:
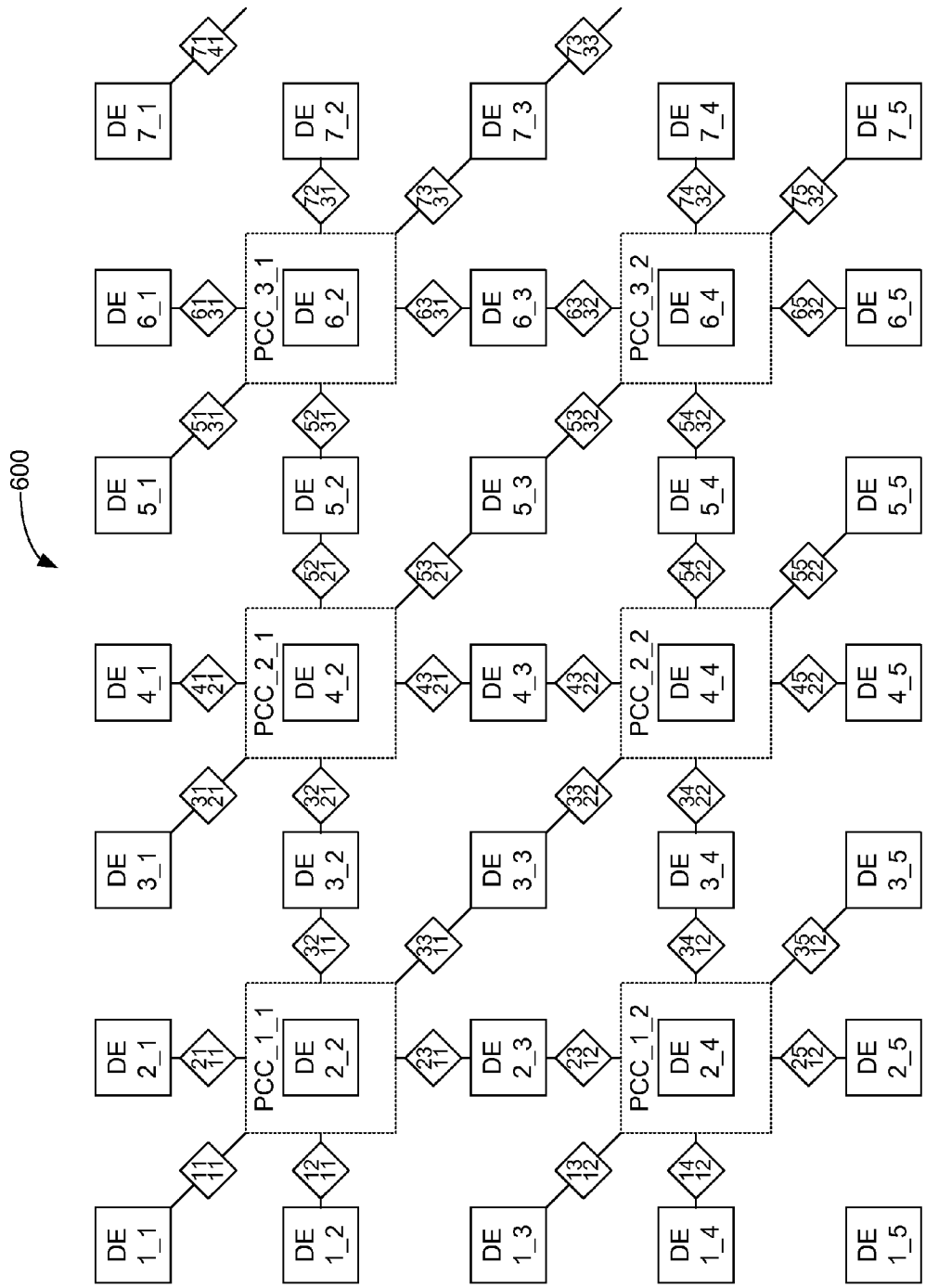
FIGS. 6A-6C is a schematic illustration of a portion of a light modulating backplane in accordance with one embodiment of the present invention.
Figure 6B:
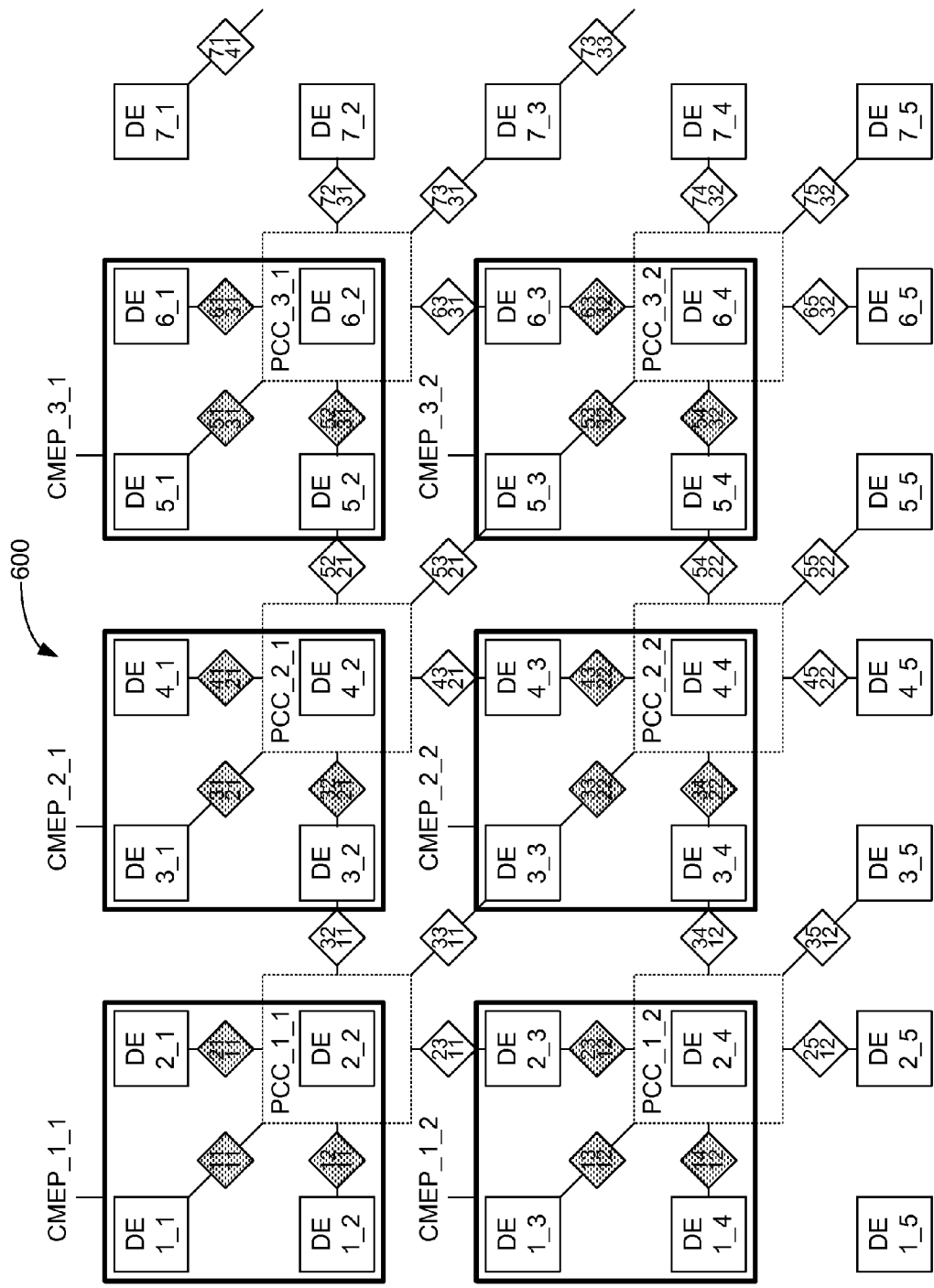
Figure 6C:
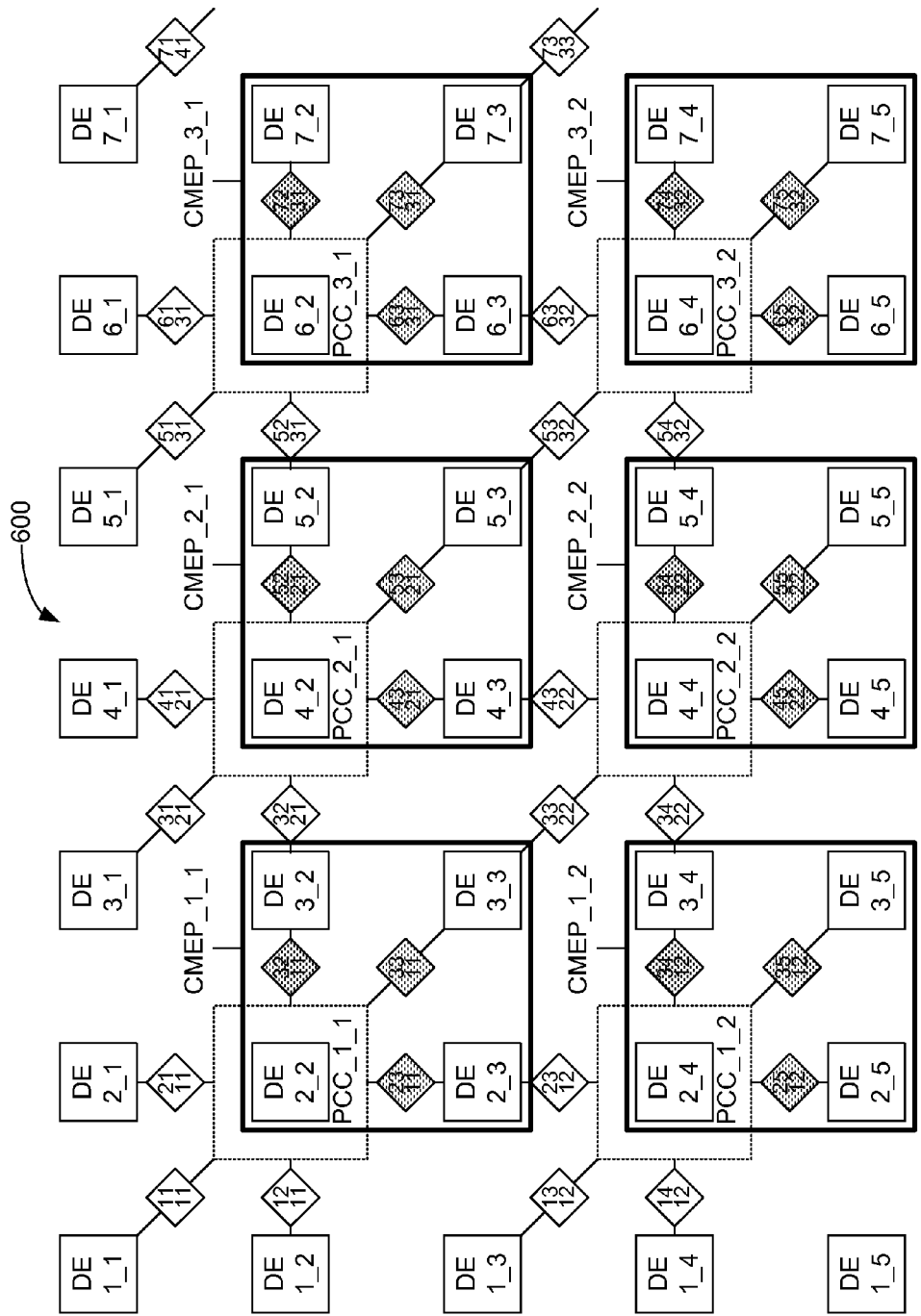

FIG. 6A is a schematic diagram of a portion of light modulating backplane 600 in accordance with one embodiment of the present invention. Like light modulating backplane 400 (FIG. 5A), light modulating backplane 600 (FIG. 6A) includes pixel control circuits PCC_1_1, PCC_1_2, PCC_2_1, PCC_2_2, PCC_3_1, and PCC_3_2; dot electrodes DE_1_1, DE_1_2, DE_1_3, DE_1_4, DE_1_5, DE_2_1, ... DE_7_4, and DE_7_5. However for clarity, the pixel control circuits of FIG. 6A are drawn behind dot electrode and thus are drawn using dotted lines. Specifically, pixel control circuit PCC_1_1 is behind dot electrode DE_2_2, pixel control circuit PCC_2_1 is behind dot electrode DE_4_2 and in general a pixel control circuit PCC_X_Y is behind dot electrode DE_(2*X)_(2*Y). Furthermore dot electrode DE_(2*X)_(2*Y), which is in front of a pixel control circuit PCC_X_Y is coupled to pixel control circuit PCC_X_Y. Thus, for example pixel control circuit PCC_3_2 is coupled to dot electrode DE_6_4. The primary difference between light modulating backplane 400 and light modulating backplane 600 is that dot electrode connection circuits in light modulating backplane 600 are coupled between dot electrodes and pixel control circuits, whereas in light modulating backplane 400 some dot electrode connection circuits are coupled between dot electrodes. Therefore for FIG. 6A, a dot electrode connection circuit is DECC_IJ_XY is coupled between dot electrode DE_I_J and pixel control circuit PCC_X_Y. However Due to space constraints in FIG. 6A, each dot electrode connection circuit DECC_IJ_XY is drawn as a diamond and labeled as IJ over XY. Thus for example dot electrode connection circuit DECC_32_11 is coupled between dot electrode DE_32_11 is a diamond with the label 32 over 11. In actual implementation, the dot electrodes would be on a first plane overlying the pixel control circuits and dot electrode connection circuits. In addition due to space constraints the control lines for the dot electrode connection circuits are omitted. For Clarity, FIGS. 6B and 6C are included to illustrate the state of the dot electrode connection circuits for odd fields (FIG. 6B) and even fields (FIG. 6C). Specifically, in FIGS. 6B and 6C dot electrode connection circuits in the active state (i.e. conducting) are shaded while the dot electrode connection circuits in the inactive state (i.e. non-conducting) are not shaded. Furthermore, configurable multi-electrode pixels are marked by large squares in FIGS. 6B and 6C.

Pixel control circuit PCC_1_1, which is part of configurable multi-electrode pixel CMEP_1_1 in FIGS. 6B and 6C, is coupled to dot electrode DE_2_2. Dot electrode connection circuit DECC_11_11 is coupled between dot electrode DE_1_1 pixel control circuit PCC_1_1. Dot electrode connection circuit DECC_21_11 is coupled between dot electrode DE_2_1 pixel control circuit PCC_1_1. Dot electrode connection circuit DECC_12_11 is coupled between dot electrode DE_1_2 pixel control circuit PCC_1_1. Dot electrode connection circuit DECC_32_11 is coupled between dot electrode DE_3_2 pixel control circuit PCC_1_1. Dot electrode connection circuit DECC_23_11 is coupled between dot electrode DE_2_3 pixel control circuit PCC_1_1. Dot electrode connection circuit DECC_33_11 is coupled between dot electrode DE_3_3 pixel control circuit PCC_1_1. As shown in FIG. 6B, for odd fields, dot electrode connection circuits DECC_11_11, DECC_21_11 and DECC_12_11 are all set to the active state (i.e. conducting) allowing pixel control circuit PCC_1_1 to control dot electrodes DE_1_1, DE_2_1, DE_1_2, and DE_2_2. As shown in FIG. 6C, for even fields, dot electrode connection circuits DECC_32_11, DECC_23_11, and DECC_33_11 are all set to the active state (i.e. conducting) allowing pixel control circuit PCC_1_1 to control dot electrodes DE_2_2, DE_3_2, DE_2_3, and DE_3_3.

Pixel control circuit PCC_2_1, which is part of configurable multi-electrode pixel CMEP_2_1 in FIGS. 6B and 6C, is coupled to dot electrode DE_4_2. Dot electrode connection circuit DECC_31_21 is coupled between dot electrode DE_3_1 pixel control circuit PCC_2_1. Dot electrode connection circuit DECC_41_21 is coupled between dot electrode DE_4_1 pixel control circuit PCC_2_1. Dot electrode connection circuit DECC_32_21 is coupled between dot electrode DE_3_2 pixel control circuit PCC_2_1. Dot electrode connection circuit DECC_52_21 is coupled between dot electrode DE_5_2 pixel control circuit PCC_2_1. Dot electrode connection circuit DECC_43_21 is coupled between dot electrode DE_4_3 pixel control circuit PCC_2_1. Dot electrode connection circuit DECC_53_21 is coupled between dot electrode DE_5_3 pixel control circuit PCC_2_1. As shown in FIG. 6B, for odd fields, dot electrode connection circuits DECC_31_11, DECC_41_21 and DECC_32_21 are all set to the active state (i.e. conducting) allowing pixel control circuit PCC_2_1 to control dot electrodes DE_3_1, DE_4_1, DE_3_2, and DE_4_2. As shown in FIG. 6C, for even fields, dot electrode connection circuits DECC_52_11, DECC_43_11, AND DECC_53_21 are all set to the active state (i.e. conducting) allowing pixel control circuit PCC_2_1 to control dot electrodes DE_4_2, DE_5_2, DE_4_3, and DE_5_3.

In general, a pixel control circuit PCC_X_Y, which is part of configurable multi-electrode pixel CMEP_X_Y, is coupled to dot electrode DE_(2*X)_(2*Y). Dot electrode connection circuit DECC_(2*X−1)(2*Y−1)_XY is coupled between dot electrode DE_(2*X−1)_(2*Y−1) pixel control circuit PCC_X_Y. Dot electrode connection circuit DECC_(2*X)_(2*Y−1)_XY is coupled between dot electrode DE_(2*X)_(2*Y−1) pixel control circuit PCC_X_Y. Dot electrode connection circuit DECC_(2*X−1)_(2*Y)_XY is coupled between dot electrode DE_(2*X−1)_(2*Y) pixel control circuit PCC_X_Y. Dot electrode connection circuit DECC_(2*X+1)(2*Y)_XY is coupled between dot electrode DE_(2*X+1)_(2*Y) pixel control circuit PCC_X_Y. Dot electrode connection circuit DECC_(2*X+1)(2*Y)_XY is coupled between dot electrode DE_(2*X)_(2*Y+1) pixel control circuit PCC_X_Y. Dot electrode connection circuit DECC_(2*X+1)(2*Y+1)_XY is coupled between dot electrode DE_(2*X+1)_(2*Y+1) pixel control circuit PCC_X_Y. For odd fields, dot electrode connection circuits DECC_(2*X−1)(2*Y−1)_XY, DECC_(2*X)(2*Y−1)_XY, and DECC_(2*X−1)(2*Y)_XY are all set to the active state (i.e. conducting) allowing pixel control circuit PCC_X_Y to control dot electrodes DE_(2*X−1)_(2*Y−1), DE_(2*X)_(2*Y−1), DE_(2*X−1)_(2*Y), and DE_(2*X)_(2*Y). For even fields, dot electrode connection circuits DECC_(2*X+1)(2*Y+1)_XY, DECC_(2*X)(2*Y+1)_XY, and DECC_(2*X+1)(2*Y)_XY are all set to the active state (i.e. conducting) allowing pixel control circuit PCC_X_Y to control dot electrodes DE_(2*X+1)_(2*Y+1), DE_(2*X)_(2*Y+1), DE_(2*X+1)_(2*Y), and DE_(2*X)_(2*Y).

Figure 7:
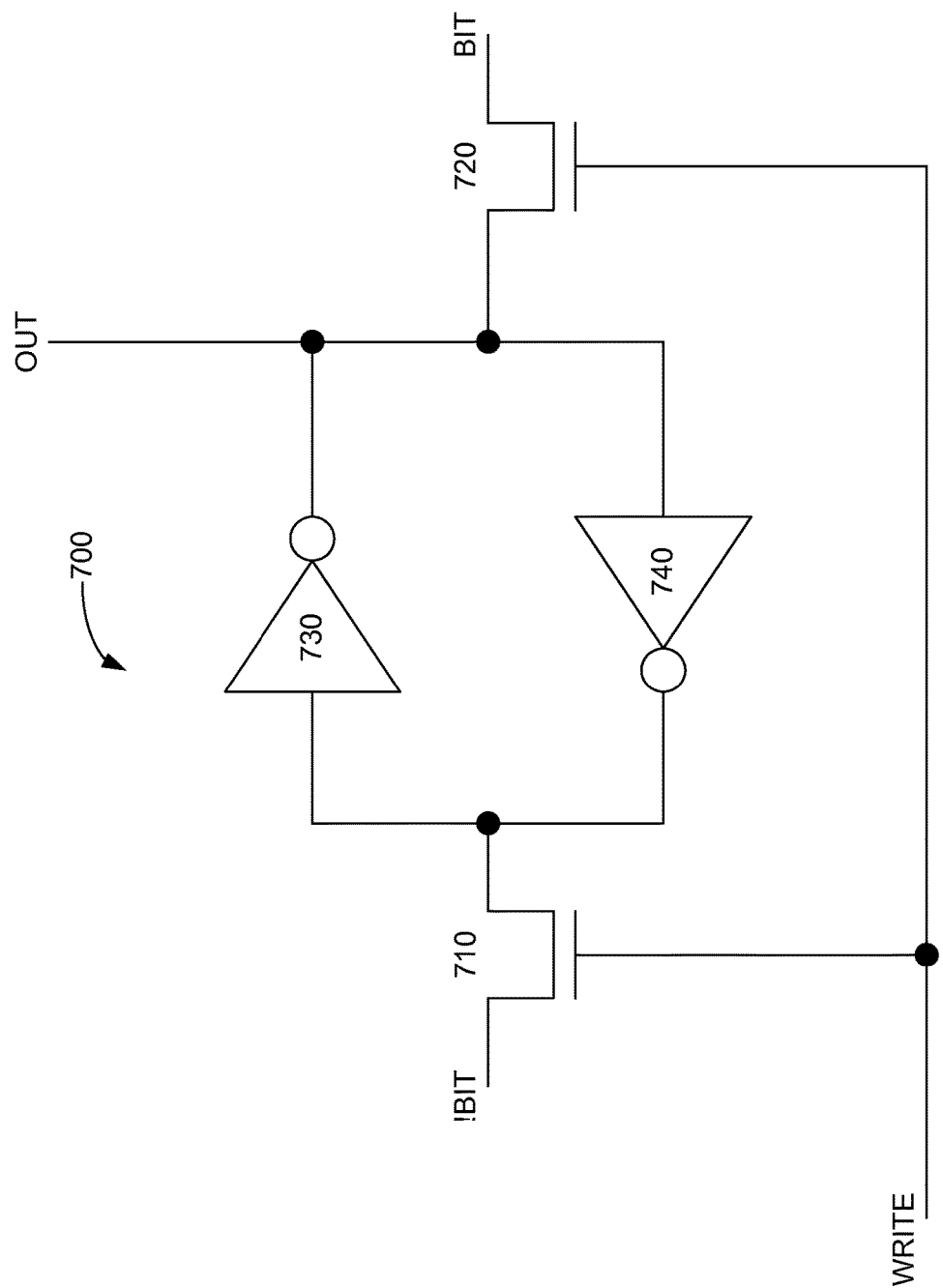
FIG. 7 is a schematic diagram of a pixel control circuit in accordance with one embodiment of the present invention.

In most embodiments of the present invention, each pixel control circuits is a one-bit memory cell. The value of the memory cell is rapidly changed using various pulse width modulation techniques to create different contrast levels in the configurable multi-electrode pixels. Most Conventional memory cells can be used for pixel control circuits. FIG. 7 is circuit diagram of a memory cell 700 used in some embodiment of the present invention. Memory Cell 700 includes a transistor 710, an transistor 720, an inverter 730, and an inverter 740. Inverters 730 and 740 are cross coupled (i.e. the input terminal of inverter 720 is coupled to the output terminal of inverter 740 and the input terminal of inverter 740 is coupled to the output terminal of inverter 730) to store a bit value. The output terminal of inverter 730 provides output terminal OUT for memory cell 700. Output terminal OUT would be coupled to dot electrodes and dot electrode connection circuits. Transistors 710 and 720 are used to change the value stored by inverters 30 and 740. Specifically, complementary input signals BIT and !BIT are applied to an input terminal of transistor 720 and 710, respectively. The output terminal of transistor 710 is coupled to the input terminal of inverter 730 and the output terminal of transistor 720 is coupled to the input terminal of inverter 740. The gate terminals of transistor 710 and 720 are coupled to a write control signal WRITE. When write control signal WRITE is in an active state (e.g. logic one), the bit stored by inverter 730 and 740 is overwritten by transistors 710 and 720. When write control signal WRITE is in the inactive state then the inverters 730 and 740 are undisturbed and stores the current bit value. In most embodiments of the present inventions, pixel control circuits are formed as a memory array. In these embodiments write control circuit WRITE is often called a row select line and complementary inputs BIT and !BIT would extend to multiple columns of memory cells.

Dot electrode connection circuits are simple switches that can put in an active state that is electrically conductive or an inactive state that is not electrically conductive (i.e. non-conductive). Any circuit that can be configured to be conductive or not conductive can be used as a dot electrode connection circuit. FIG. 8 is a circuit diagram of a dot electrode connection circuit 800 used in some embodiments of the present invention. Dot electrode connection circuit 800 is a conventional CMOS transmission gate made up of a NMOS transistor 810 and a PMOS transistor 820 coupled in parallel between a first input/output terminal IO1 and a second input/output terminal IO2. A first control terminal C is coupled to the gate terminal of NMOS transistor 810 and a second control terminal !C is coupled to the gate terminal of PMOS transistor 820. When control signal C is at logic high and control signal !C is at logic low, dot electrode connection circuit 800 is in the active state and becomes conductive between input output terminal IO1 and input/output terminal IO2. Conversely, When control signal C is at logic low and control signal !C is at logic high, dot electrode connection circuit 800 is in the inactive state and becomes non-conductive between input output terminal IO1 and input/output terminal IO2.

In general interlace displays do not provide the same picture quality of progressive displays at the same resolution level. For example a high definition display has a resolution of 1920×1080. A display using quincunx interlacing would only need a resolution of 960×540 to display the high definition images. However, the picture quality would be lower on the quincunx interlaced display. Therefore, some embodiments of the present invention achieve equivalent picture quality using a novel oversampling technique. Specifically, in some embodiments of the present invention, a quincunx interlaced display would have a resolution higher than 960×540 but lower than 1920×1080. The HD images would be upscaled to the higher equivalent quincunx interlaced resolution and then displayed. For example a specific embodiment of the present invention, using quincunx interlacing has a resolution of 1280×720 which is equivalent to a 2560×1440 resolution. Thus 1920×1080 images are first upscaled to 2560×1440 before being displayed on the display using quincunx interlacing. The image quality of the higher resolution quincunx interlace display compensates for the interlacing technique to improve the picture quality to the same level as the 1920×1080 display.

In the various embodiments of the present invention, novel structures and methods have been described for creating a high resolution light modulating backplane. The various embodiments of the structures and methods of this invention that are described above are illustrative only of the principles of this invention and are not intended to limit the scope of the invention to the particular embodiment described. For example, in view of this disclosure those skilled in the art can define other pixel control circuits, dot electrodes, dot electrode connection circuits, configurable multi-electrode pixels, light modulating units, and so forth, and use these alternative features to create a method or system according to the principles of this invention. Thus, the invention is limited only by the following claims.

What is claimed is:
1. A pixel of a light modulating backplane comprising:
a pixel control circuit;
a first dot electrode;
a first dot electrode connection circuit coupled to the pixel control circuit and the first dot electrode, wherein the first dot electrode connection circuit is configurable to have an active state to electrically connect the pixel control circuit to the first dot electrode and an inactive state to electrically isolate the first dot electrode from the pixel control circuit;

a second dot electrode;

a second dot electrode connection circuit coupled to the pixel control circuit and the second dot electrode, wherein the second dot electrode connection circuit is configurable to have an active state to electrically connect the pixel control circuit to the second dot electrode and an inactive state to electrically isolate the second dot electrode from the pixel control circuit.

2. The pixel of claim 1 further comprising a dedicated dot electrode coupled to the pixel control circuit.

3. The pixel of claim 2, wherein the first dot electrode connection circuit is coupled to the pixel control circuit through the dedicated dot electrode.

4. The pixel of claim 3, wherein the second dot electrode connection circuit is coupled to the pixel control circuit through the dedicated dot electrode.

5. The pixel of claim 2, wherein the pixel is configured so that the first dot electrode connection circuit is in an active state during a first field and an inactive state during a second field.

6. The pixel of claim 5, wherein the pixel is configured so that the second dot electrode connection circuit is in the inactive state during the first field and the active state during the second field.

7. The pixel of claim 2, further comprising:

a third dot electrode;

a third dot electrode connection circuit coupled to the pixel control circuit and the third dot electrode;

a fourth dot electrode; and a fourth dot electrode connection circuit coupled to the pixel control circuit and the fourth dot electrode.

8. The pixel of claim 7, wherein the dedicated dot electrode is located between the first dot electrode and the second dot electrode and wherein the dedicated dot electrode is located between the third dot electrode and the fourth dot electrode.

9. The pixel of claim 8, wherein the pixel is configured so that:

the first dot electrode connection circuit is in an active state during a first field and an inactive state during a second field;

the second dot electrode connection circuit is in the inactive state during the first field and the active state during the second field;

the third dot electrode connection circuit is in the active state during the first field and the inactive state during the second field; and the fourth dot electrode connection circuit is in the inactive state during the first field and the active state during the second field.

10. The pixel of claim 8, wherein the third dot electrode connection circuit is coupled to the pixel control circuit through the first dot electrode.

11. The pixel of claim 7, further comprising:

a fifth dot electrode;

a fifth dot electrode connection circuit coupled to the pixel control circuit and the fifth dot electrode;

a sixth dot electrode;

a sixth dot electrode connection circuit coupled to the pixel control circuit and the sixth dot electrode.

12. The pixel of claim 11, wherein the dedicated dot electrode is located between the first dot electrode and the second dot electrode and wherein the dedicated dot electrode is located between the third dot electrode and the fourth dot electrode and wherein the dedicated dot electrode is located between the fifth dot electrode and the sixth dot electrode.

13. The pixel of claim 12, wherein the first dot electrode, the third dot electrode, the fifth dot electrode and the dedicated dot electrode form a first rectangle.

14. The pixel of claim 13, wherein the first rectangle is a square.

15. The pixel of claim 13, wherein the second dot electrode, the fourth dot electrode, the sixth dot electrode, and the dedicated dot electrode form a second rectangle.

16. The pixel of claim 12, wherein the pixel is configured so that:

the first dot electrode connection circuit is in an active state during a first field and an inactive state during a second field;

the second dot electrode connection circuit is in the inactive state during the first field and the active state during the second field;

the third dot electrode connection circuit is in the active state during the first field and the inactive state during the second field; and the fourth dot electrode connection circuit is in the inactive state during the first field and the active state during the second field; and the fifth dot electrode connection circuit is in the active state during the first field and the inactive state during the second field;

the sixth dot electrode connection circuit is in the inactive state during the first field and the active state during the second field.

17. The pixel of claim 12, further comprising a seventh dot electrode;

a seventh dot electrode connection circuit coupled to the pixel control circuit and the seventh dot electrode;

an eighth dot electrode;

an eighth dot electrode connection circuit coupled to the pixel control circuit and the eighth dot electrode;

wherein the dedicated dot electrode is between the seventh dot electrode and the eighth dot electrode.

18. The pixel of claim 17, wherein the first dot electrode, the third dot electrode, the fifth dot electrode and the dedicated dot electrode form a first rectangle;

the second dot electrode, the fourth dot electrode, the sixth dot electrode, and the dedicated dot electrode form a second rectangle;

the second dot electrode, the third dot electrode, the eighth dot electrode, and the dedicated dot electrode form a third rectangle; and the first dot electrode, the fourth dot electrode, the seventh dot electrode, and the dedicated dot electrode form a fourth rectangle.

19. The pixel of claim 1, wherein the first dot electrode and the second dot electrode are formed using a reflective material.

20. The pixel of claim 1, wherein the pixel control circuit is a memory cell.

21. The pixel of claim 1 wherein the first dot electrode and the second dot electrode are formed in a first plane and the first dot electrode connection circuit, the second dot connection circuit and the pixel control circuit are formed beneath the first plane.

* * * * *